(12) United States Patent
Ohba et al.

(10) Patent No.: US 9,736,458 B2
(45) Date of Patent: Aug. 15, 2017

(54) MOVING IMAGE CAPTURING DEVICE, INFORMATION PROCESSING SYSTEM, INFORMATION PROCESSING DEVICE, AND IMAGE DATA PROCESSING METHOD

(75) Inventors: Akio Ohba, Kanagawa (JP); Hiroyuki Segawa, Kanagawa (JP); Hideyuki Saito, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 639 days.

(21) Appl. No.: 14/232,985

(22) PCT Filed: May 31, 2012

(86) PCT No.: PCT/JP2012/003575
§ 371 (c)(1),
(2), (4) Date: Jan. 15, 2014

(87) PCT Pub. No.: WO2013/014844
PCT Pub. Date: Jan. 31, 2013

(65) Prior Publication Data
US 2014/0152773 A1 Jun. 5, 2014

(30) Foreign Application Priority Data

Jul. 25, 2011 (JP) .................................. 2011-162334

(51) Int. Cl.
*H04N 5/225* (2006.01)
*H04N 7/03* (2006.01)
(Continued)

(52) U.S. Cl.
CPC ..... *H04N 13/0203* (2013.01); *H04N 13/0048* (2013.01); *H04N 13/0059* (2013.01); *H04N 21/4223* (2013.01); *A63F 13/213* (2014.09)

(58) Field of Classification Search
CPC ............... H04N 5/23229; H04N 5/332; H04N 13/0048; H04N 9/045; H04N 13/0203;
(Continued)

(56) References Cited

U.S. PATENT DOCUMENTS 6,456,335 B1 * 9/2002 Miura .................. H04N 5/2624
348/14.12
6,714,660 B1 * 3/2004 Ohba ...................... G06F 3/012
345/204

(Continued)

FOREIGN PATENT DOCUMENTS

CN 102111629 A 6/2011
EP 0999518 A1 5/2000
(Continued)

OTHER PUBLICATIONS

Office Action for corresponding Taiwan Application No. 101126855, dated Jan. 16, 2015.

(Continued)

*Primary Examiner* — Tat Chio
*Assistant Examiner* — Patrick Demosky
(74) *Attorney, Agent, or Firm* — Matthew B. Dernier, Esq.

(57) ABSTRACT

A capture device is equipped with a stereo camera, and generates a plurality of demosaiced images of different sizes in which the left and right frame images have been reduced in stepwise fashion. A virtual composite image is generated that includes the plurality of demosaiced images, in which the pixel rows of the rows are pixel rows having undergone one round of connection. A host terminal sends to the capture device a data request signal designating a plurality of areas within the composite image, having a shared range in the longitudinal direction. The capture device clips out the designated areas, and sends to the host terminal a stream of (Continued)

a new composite image comprising only the clipped out areas. The host terminal cuts this into separate images, which are expanded into consecutive addresses in a main memory.

12 Claims, 16 Drawing Sheets

(51) Int. Cl.
| | | |
|---|---|---|
| *H04N 9/45* | (2006.01) | |
| *G06F 3/00* | (2006.01) | |
| *H04N 13/02* | (2006.01) | |
| *H04N 21/4223* | (2011.01) | |
| *H04N 13/00* | (2006.01) | |
| *A63F 13/213* | (2014.01) | |

(58) Field of Classification Search
CPC ........... H04N 13/0059; H04N 21/4223; H04N 7/173; H04N 5/225; H04N 13/02; G06T 3/4038; A63F 13/213
See application file for complete search history.

(56) References Cited

U.S. PATENT DOCUMENTS

| | | | | |
|---|---|---|---|---|
| 7,200,247 | B2* | 4/2007 | Ohba | G06F 3/012 |
| | | | | 345/204 |
| 7,319,453 | B2* | 1/2008 | Nojiri | G09G 3/3614 |
| | | | | 345/100 |
| 8,810,629 | B2 | 8/2014 | Kosakai | |
| 9,030,569 | B2 | 5/2015 | Ohba | |
| 9,247,132 | B2* | 1/2016 | Ohba | H04N 5/2628 |
| 2007/0002159 | A1* | 1/2007 | Olsen | G02B 7/04 |
| | | | | 348/335 |
| 2011/0128394 | A1* | 6/2011 | Narayanan | G06F 3/4076 |
| | | | | 348/222.1 |
| 2011/0157305 | A1* | 6/2011 | Kosakai | H04N 13/004 |
| | | | | 348/43 |
| 2012/0218438 | A1 | 8/2012 | Ohba | |
| 2014/0078265 | A1 | 3/2014 | Ohba | |

FOREIGN PATENT DOCUMENTS

| | | | | |
|---|---|---|---|---|
| EP | 2498486 A1 | 9/2012 | | |
| JP | 11234654 A | 8/1999 | | |
| JP | 2006013875 A | 1/2006 | | |
| JP | 2007053491 A | 3/2007 | | |
| JP | 2010-072688 A | 4/2010 | | |
| JP | WO 2011052114 A1 * | 5/2011 | | H04N 7/14 |
| WO | 2011052114 A1 | 5/2011 | | |
| WO | 2012157178 A1 | 11/2011 | | |

OTHER PUBLICATIONS

Office Action for corresponding Canadian Application No. 2842301, dated May 4, 2015.
Office Action for corresponding Chinese Application No. 201280045359, dated May 11, 2015.
Office Action for corresponding AU Application No. 2012288349, dated Sep. 13, 2015.
International Preliminary report on Patentability and Written Opinion for corresponding PCT Application No. PCT/JP2012/003575, dated Feb. 6, 2014.
office Action for corresponding JP Patent Application JP2012241760, pp. 1-5, dated Jan. 26, 2016.
International Search Report for corresponding PCT Application No. PCT/2012003575, dated Jul. 3, 2012.

* cited by examiner

MOVING IMAGE CAPTURING DEVICE, INFORMATION PROCESSING SYSTEM, INFORMATION PROCESSING DEVICE, AND IMAGE DATA PROCESSING METHOD

TECHNICAL FIELD

The present invention relates to a technology for performing information processing in accordance with the movement of an object.

BACKGROUND ART

In the related art, games are known in which an image of a part of a user's body such as a head is captured by a video camera, a predetermined area (e.g., an area including an image of an eye, a mouth, a hand, or the like) is extracted from the image, and the area is replaced with another image so as to be displayed on a display (for example, see patent document No. 1). A user interface is also known that receives, as an instruction for operating an application, the movement of a mouth or a hand captured by a video camera.

RELATED ART LIST

Patent Document

[Patent Document1] European Patent Application No. 0999518

SUMMARY OF THE INVENTION

Problem to be Solved by the Invention

In a technique such as the one described above, a high-resolution image is required in order to extract a predetermined area (e.g., an area including a user's mouth, hand, or the like). However, as the performance of an imaging element of a video camera increases, the amount of image data is increased. As a result, there is a problem of increasing cost for data mining processing (e.g. filtering, scaling, cropping, or the like) that provides, in an appropriate scale, information necessary for compression/expansion processing for transfer, recognition processing, detection processing, measurement processing, or the like, and there is a problem of increasing latency from the time of camera input to the time of each output of the processing. The use of the camera as a user interface creates a problem where an increase in the latency dramatically reduces usability. As described, even when the performance of an imaging element of a video camera is increased, the performance of a system as a whole may be reduced.

The present invention addresses the aforementioned issue, and a purpose thereof is to provide an image processing technology that can suppress latency from the time of image capturing to the time of image display using the data thereof while using a high-performance imaging element.

Means to Solve the Problem

One embodiment of the present invention relates to a moving image capturing device. The moving image capturing device includes: an image data generation unit configured to generate a plurality of pieces of image data from each frame image of a moving image obtained by capturing an image of a target object, and configured to sequentially output the image data as a stream for each single horizontal row of pixels; an image synthesis unit configured to cyclically connect the plurality of pieces of image data, which is output from the image data generation unit, for each single horizontal row of pixels or for each row of pixels for a range smaller than the single horizontal row, and configured to output resultant data as a stream so as to generate a virtual synthesized image which includes the plurality of images and in which a row of pixels that results when a connection cycle is completed is defined as a horizontal row of pixels; and an image transmission unit configured to receive, from a connected host terminal, a request to transmit data specifying a plurality of rectangular areas having a common vertical range in the virtual synthesized image, configured to crop out ranges corresponding to the rectangular areas for each row of pixels of the virtual synthesized image output by the image synthesis unit, configured to connect the ranges, and configured to transmit as a stream to the host terminal.

Another embodiment of the present invention relates to an information processing system. The information processing system includes: a moving image capturing device configured to capture an image of a target object and generate moving image data; and a host terminal configured to acquire a part of the moving image data from the moving image capturing device, configured to perform a predetermined image processing by using the part of the moving data, and configured to display an image. The moving image capturing device includes: an image data generation unit configured to generate a plurality of pieces of image data from each frame image of a moving image and configured to output the image data sequentially as a stream for each single horizontal row of pixels; an image synthesis unit configured to cyclically connect the plurality of pieces of image data, which is output from the image data generation unit, for each single horizontal row of pixels or for each row of pixels for a range smaller than the single horizontal row, and configured to output resultant data as a stream so as to generate a virtual synthesized image which includes the plurality of images and in which a row of pixels that results when a connection cycle is completed is defined as a horizontal row of pixels; and an image transmission unit configured to receive, from a connected host terminal, a request to transmit data specifying a plurality of rectangular areas having a common vertical range in the virtual synthesized image, configured to crop out ranges corresponding to the rectangular areas for each row of pixels of the virtual synthesized image output by the image synthesis unit, configured to connect the areas, and configured to transmit as a stream to the host terminal. The host terminal includes: a data requesting unit configured to specify a plurality of rectangular areas in the virtual synthesized image, the rectangular areas corresponding to at least two pieces of image data included in a plurality of pieces of image data generated in the moving image capturing device, by setting a common vertical range for the rectangular areas so as to request transmission of data; and a data deploying unit configured to segment the stream transmitted from the moving image capturing device into pieces of individual image data on the basis of a horizontal length of each specified rectangular area and configured to deploy the data into a memory as a two dimensional image.

Still another embodiment of the present invention relates to an information processing device. The information processing device includes: a data requesting unit configured to request transmission of data from a moving image capturing device, which generates a synthesized image where a plurality of images that are generated from each frame image of a moving image obtained by capturing an image of a target object are disposed at predetermined rectangular areas respectively, by specifying a plurality of rectangular areas in the synthesized image, the rectangular areas corresponding to at least two pieces of image data, while setting a common vertical range for the rectangular areas; a data deploying unit configured to separate image data transmitted from the moving image capturing device in a stream format in response with the request, where pixel values of the specified plurality of rectangular areas are connected for each row of pixels cyclically, into one or more pieces of individual image data on the basis of a horizontal length of each specified rectangular region and configured to deploy the data into a memory as a two dimensional image; and a data processing unit configured to perform a predetermined image processing by using the two dimensional image and configured to display an image.

Yet another embodiment of the present invention relates to an image data processing method. The image data processing method performed by a moving image capturing device includes: generating a plurality of pieces of image data from each frame image of a moving image obtained by capturing an image of a target object, and sequentially outputting the image data as a stream for each single horizontal row of pixels; connecting cyclically the output plurality of pieces of image data for each single horizontal row of pixels or for each row of pixels for a range smaller than the single horizontal row, and outputting resultant data as a stream so as to generate a virtual synthesized image which includes the plurality of images and in which a row of pixels that results when a connection cycle is completed is defined as a horizontal row of pixels; and receiving, from a connected host terminal, a request to transmit data specifying a plurality of rectangular areas having a common vertical range in the virtual synthesized image, cropping out ranges corresponding to the rectangular areas for each row of pixels of the virtual synthesized image, connecting the ranges, and transmitting as a new stream to the host terminal.

Optional combinations of the aforementioned constituting elements, and implementations of the invention in the form of methods, apparatuses, systems, computer programs, and recording media that store computer programs may also be practiced as additional modes of the present invention.

Advantageous Effect of the Invention

According to the present invention, latency from the time of image capturing to the time of image display using the data thereof can be suppressed.

MODE FOR CARRYING OUT THE INVENTION

Figure 1:
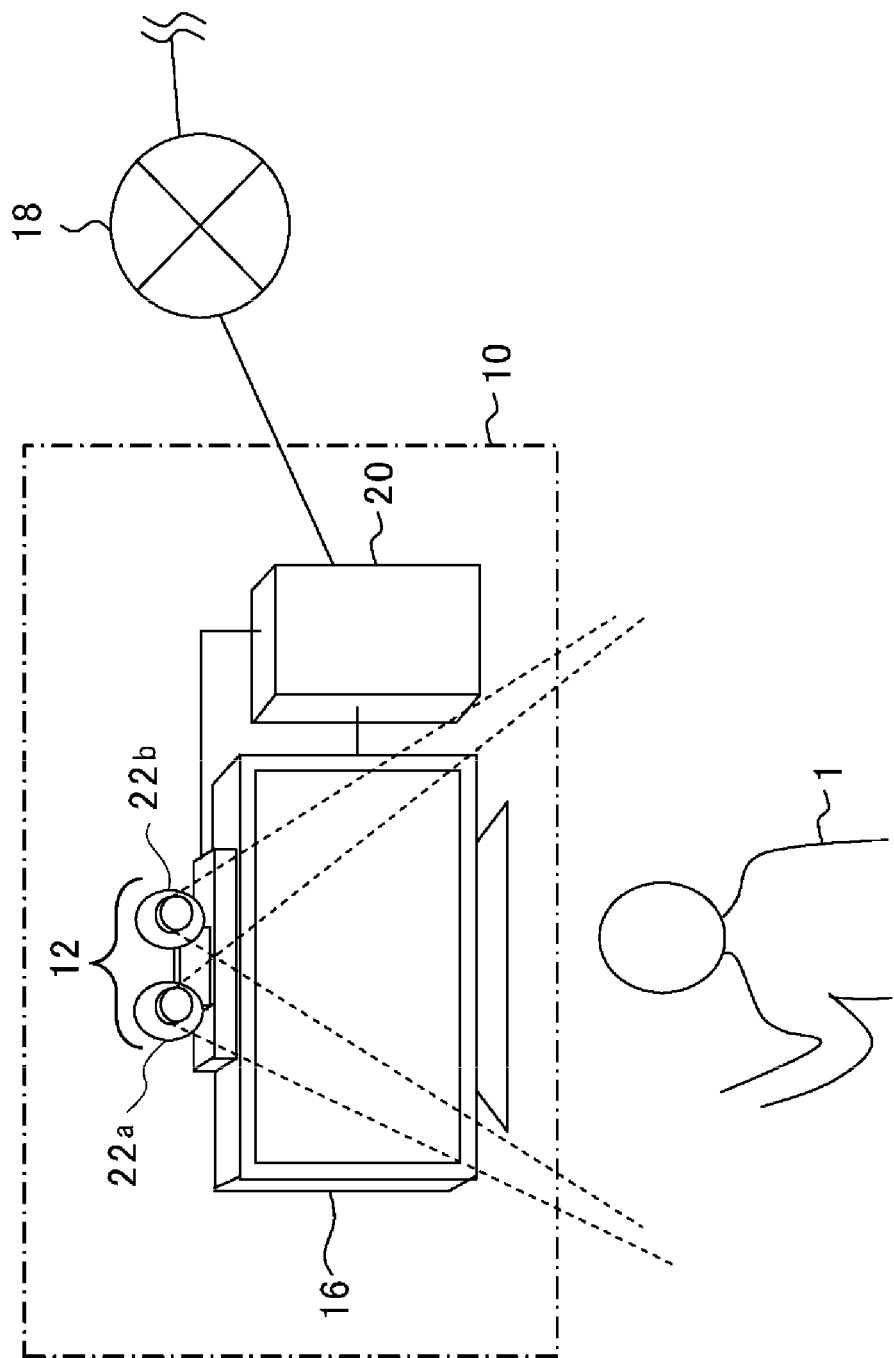
FIG. 1 shows an exemplary configuration of an information processing system to which the present embodiment can be applied.

FIG. 1 shows an exemplary configuration of an information processing system to which the present embodiment can be applied. The information processing system 10 includes an imaging device 12 on which two cameras are installed that capture a target object such as a user 1 or the like, a host terminal 20 that processes information in accordance with a user request on the basis of a captured image, and a display device 16 that outputs image data obtained as a result of processing by the host terminal 20. The host terminal 20 is configured so as to be connectable with a network 18, such as the Internet or the like.

The host terminal 20 may be connected to the imaging device 12, the display device 16, and the network 18 via a cable or connected wirelessly via a wireless Local Area Network (LAN) or the like. Any two of or all of the imaging device 12, the host terminal 20, and the display device 16 may be equipped by being combined in an integrated fashion. The imaging device 12 is not necessarily installed on the display device 16. The user 1 may not be a human, and the number thereof is not limited.

The imaging device 12 is configured so that two digital video cameras (i.e., a first camera 22a and a second camera 22b) are arranged at right and left with a known distance in between. The first camera 22a and the second camera 22b comprise respectively an imaging element such as a Charge Coupled Device (CCD), a Complementary Metal Oxide Semiconductor (CMOS), or the like. Two digital video cameras capture a target object existing in a same space from a right position and a left position respectively at a same frame rate or at different frame rates. The imaging device 12 generates a plurality of types of image data by using an image obtained as a result of the capturing.

Data of an image captured and generated by the imaging device 12 is transmitted to the host terminal 20 in a streaming format that will be described later. The host terminal 20 performs necessary information processing by using the transmitted image data, and generates an output image. The type of processing performed by the host terminal 20 is not limited particularly, and is set appropriately based on a function or an application required by a user.

For example, in the case of playing a game where a character, to which a motion of the user 1 that is a target object is reflected, appears or in the case of performing information processing that converts the motion of the user 1 to command input, the host terminal 20 performs stereo matching on the basis of data on right and left images at a same time point acquired from the imaging device 12. By identifying, at a predetermined rate, the coordinates of the position of the target object in a three dimensional space of height, width and depth with respect to a field of view of the cameras, the host terminal 20 acquires the time variation of the coordinates of the position. Based on the result thereof, the host terminal 20 performs a predetermined process on the captured image and/or reflects the result to an image prepared in advance so as to generate an output image.

In the case of a video chat application, an image of the user 1 is transmitted in real time via the network 18 to another user in chat. In this case, the host terminal 20 may perform a face detection process and may process the image, for example by depicting with high-resolution only a face area of the user 1 obtained as the result of the face detection process. In addition to such image processing, the host terminal 20 may synthesize an object image, for example a menu or a cursor for executing various types of applications.

The display device 16 displays as an image the result of the processing performed by the host terminal 20 as necessary. The display device 16 may be a television set provided with a display for outputting an image and a speaker for outputting sound, and may be for example a liquid crystal television, a plasma television, a PC display, or the like.

As described above, various types of processing can be adopted as the processing performed in the information processing system 10 by using a moving image captured by the imaging device 12, and the type of processing is not limited particularly. In any of the cases of performing one of those processes, the imaging device 12 does not only capture a moving image but also generates a plurality of types of image data by using the captured moving image in accordance with the present embodiment. By effectively transmitting only image data specified by the host terminal 20, an information processing system can be realized that has low latency for processes from capturing an image to displaying an image and that is capable of advanced processing. The type of image generated by the imaging device 12 can also be determined as appropriate in accordance with an application or the like. However, an explanation will be given below on the case of generating data of an image with which each frame of a moving image is represented in a plurality of resolutions.

Figure 2:
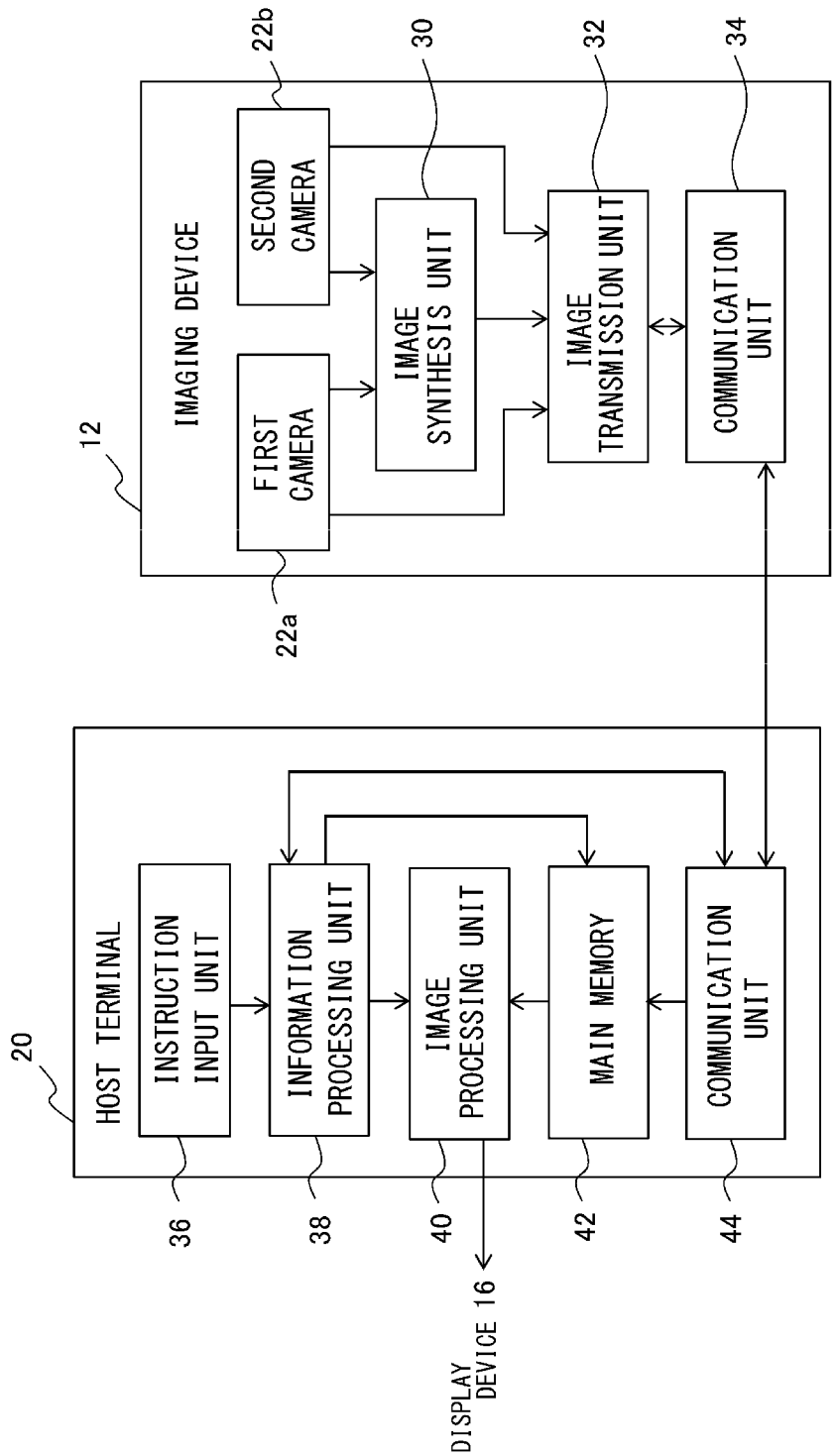
FIG. 2 shows a configuration of a host terminal and an imaging device according to the present embodiment.
Figure 3:
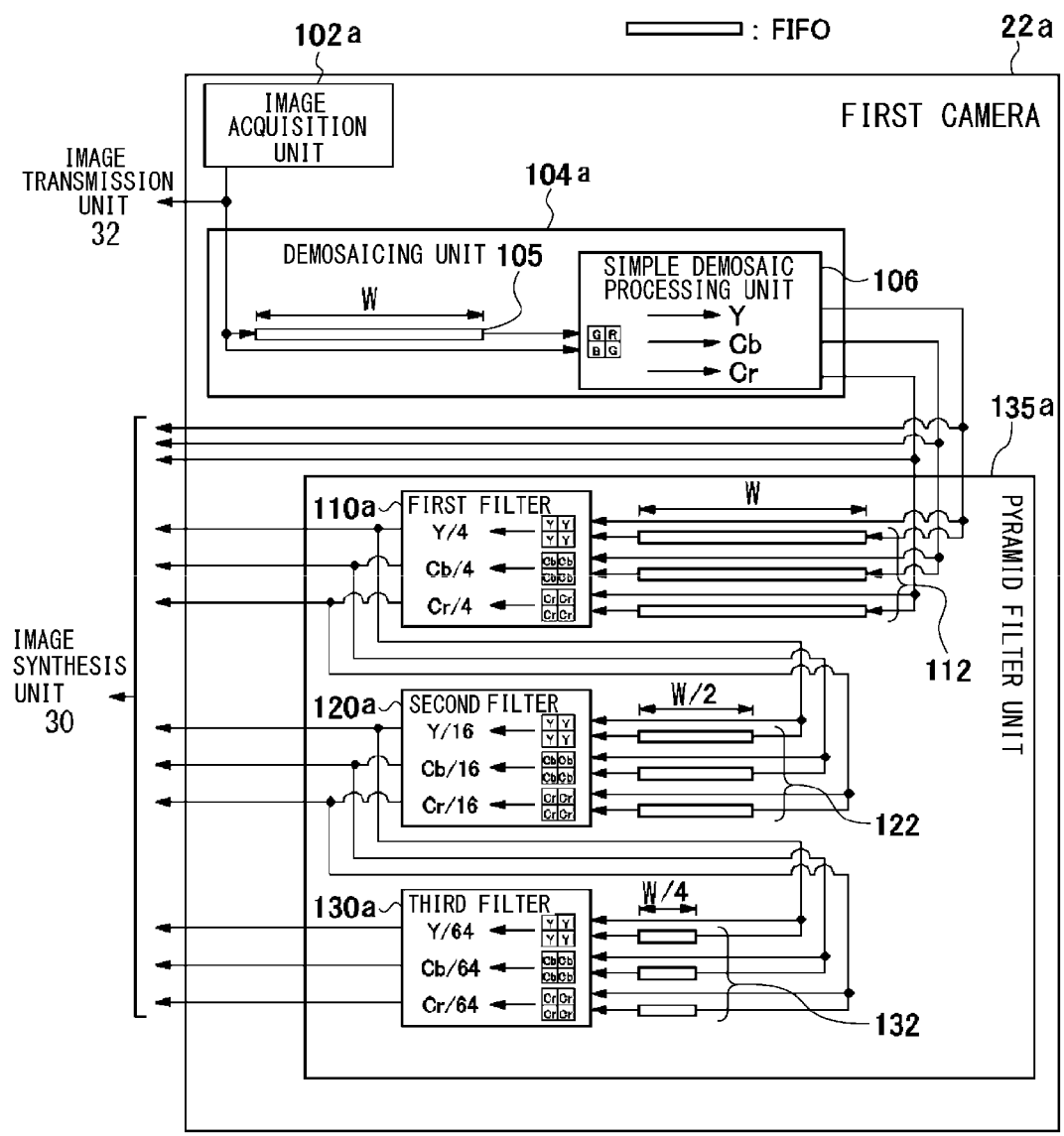
FIG. 3 shows a detailed configuration of a first camera of the imaging device according to the present embodiment.
Figure 4:
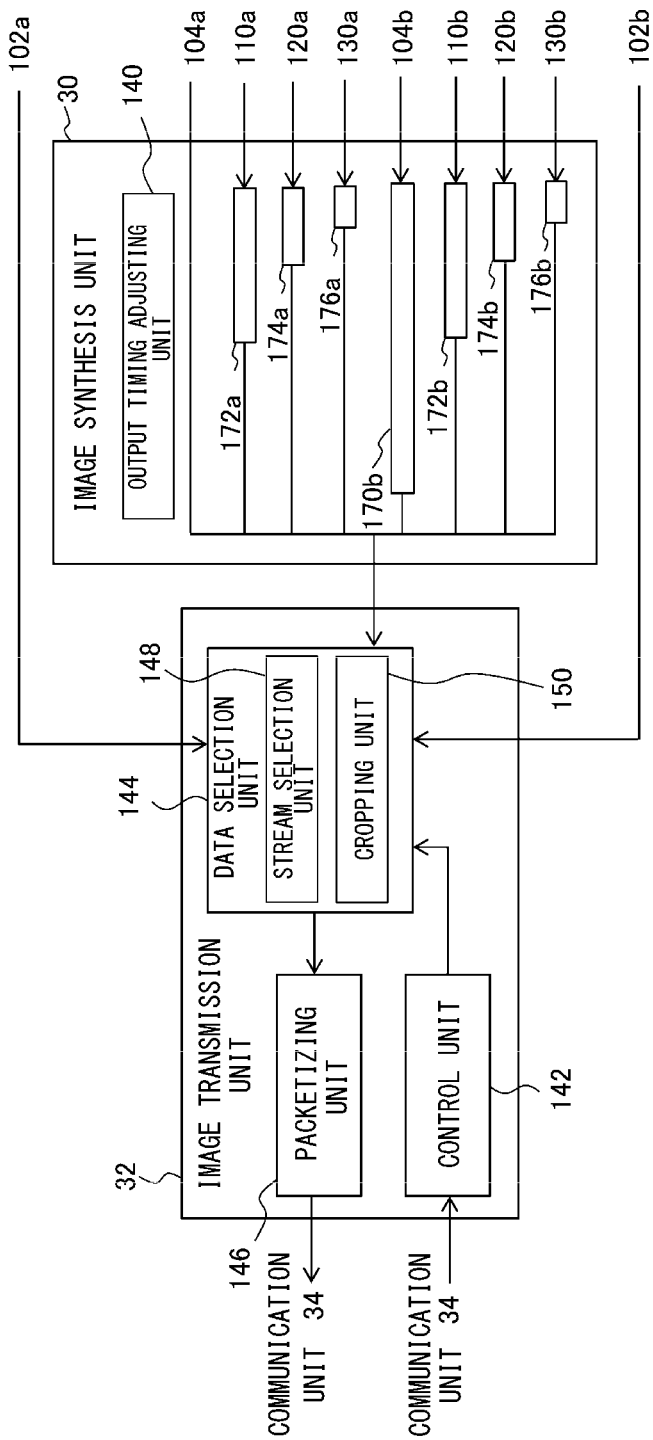
FIG. 4 shows the detailed configuration of an image synthesis unit and an image transmission unit according to the present embodiment.

FIG. 2 shows the configuration of the host terminal 20 and the imaging device 12. In FIG. 2 and FIGS. 3 and 4, which will be described later, the elements shown in functional blocks are implemented in hardware by constituting elements, such as a Central Processing Unit (CPU), a Random Access Memory (RAM), a Read Only Memory (ROM), a rendering circuit, or the like, and in software by a program providing various functions, such as, a data input function, a data storing function, an image analysts function, a rendering function, or the like. Therefore, it will be obvious to those skilled in the art that the functional blocks may be implemented in a variety of ways, by hardware only, software only, or a combination thereof.

The host terminal 20 includes an instruction input unit 36, an information processing unit 38, an image processing unit 40, a main memory 42, and a communication unit 44. The instruction input unit 36 acquires an instruction input from a user. The information processing unit 38 controls the host terminal 20 and the imaging device 12 in a unified manner, and performs information processing in accordance with a purpose. The image processing unit 40 generates an output image. The main memory 42 stores image data provided from the imaging device 12. The communication unit 44 is an interface that makes a request for an image data to the imaging device 12 and acquires the image data from the imaging device 12.

The instruction input unit 36 receives an instruction input from a user, generates a signal requesting a process according to the instruction, and transmits the signal to the information processing unit 38. The instruction input unit 36 is implemented by cooperative working between a commonly-used input device (e.g., a button, a keyboard, a mouse, a trackball, a touch panel, or the like) and a processor or the like that interprets an operation input into the input device and generates a signal requesting a process.

In accordance with the signal requesting a process acquired from the instruction input unit 36, the information processing unit 38 issues a request for image data to the imaging device 12, issues a request for image processing to the image processing unit 40, etc. The information processing unit 38 deploys image data transmitted from the imaging device 12 in the main memory 42 as will be described later. Further, as necessary depending on a process performed by the information processing system 10, the information processing unit 38 performs image analysis (e.g., stereo matching, tracking of a target object, face detection, gesture detection, or the like) by using the image data transmitted from the imaging device 12.

The image processing unit 40 performs image processing according to the request sent from the information processing unit 38 by using the image deployed in the main memory 42, and generates a display image. The generated display image is stored in a frame memory (not shown in figures), and is sequentially displayed on the display device 16 under the control of the information processing unit 38. The communication unit 44 acquires a signal requesting image data from the imaging device 12, the signal generated by the information processing unit 38, and transmits the signal to the imaging device 12. In addition, the communication unit 44 acquires image data transmitted from the imaging device 12 in response to the signal, and transmits the image data to the information processing unit 38.

The imaging device 12 includes the first camera 22a and the second camera 22b, an image synthesis unit 30, an image transmission unit 32, and a communication unit 34. The first camera 22a and the second camera 22b capture a moving image and generate a plurality of types of image data. The image synthesis unit 30 integrates a plurality of types of image data. The image transmission unit 32 extracts image data requested by the host terminal 20 and packetizes the image data. The communication unit 34 is an interface that receives from the host terminal 20 a signal requesting an image data and transmits image data.

The first camera 22a and the second camera 22b capture a moving image of a same target object from the right and left viewpoints. Then the first camera 22a and the second camera 22b reduce the size of the captured frame image to a plurality of sizes so as to generate a plurality of pieces of image data of different resolutions. The image synthesis unit 30 integrates image data generated by the first camera 22a and the second camera 22b, and generates a virtual synthesized image as will be described later.

The image transmission unit 32 extracts image data required by the host terminal 20 from a RAW image captured by the first camera 22a and the second camera 22b and from the virtual synthesized image generated by the image synthesis unit 30, and packetizes the extracted image data. In this process, in the case that image data included in the virtual synthesized image is requested, an image is clipped by a cropping process.

The communication unit 34 receives a signal requesting image data sent from the host terminal 20. Then the communication unit 34 notifies the image transmission unit 32 of the signal, and acquires a packet of image data generated by the image transmission unit 32 and transmits the packets to the host terminal 20. The communication unit 34 transmits packets to the host terminal 20 in accordance with a predetermined communication protocol, for example, USB1.0/2.0/3.0 or the like. The communication to and from the host terminal 20 is not limited to wired communication but may be wireless communication, for example, wireless LAN communication (e.g., IEEE802.11a/b/g or the like) or infrared communication (e.g., IrDA or the like).

A process performed by the imaging device 12 is basically performed for each horizontal row of pixels of an image, and the processed data is provided to a next functional block for each horizontal row of pixels. With this, a minimum line buffer alone will suffice as memory to be provided in each functional block of the imaging device 12, and processes ranging from image capturing to image data transmission can be performed with low latency.

FIG. 3 shows the configuration of the first camera 22a of the imaging device 12 in detail. The second camera 22b also has a similar configuration. The first camera 22a comprises an image acquisition unit 102a, a demosaicing unit 104a, and a pyramid filter unit 135a. The image acquisition unit 102a reads, at a predetermined frame rate, an image exposed to an imaging element such as a CCD or a CMOS. In the following explanation, it is assumed that this image has a width of "W" pixels in a horizontal direction and a width of "H" pixels in a vertical direction. This image is a so-called RAW image. The image acquisition unit 102a transmits the RAW image to the demosaicing unit 104a and to the image transmission unit 32 every time the exposure is completed for a single horizontal row of the RAW image.

The demosaicing unit 104a has a First In First Out (FIFO) buffer 105 having a capacity of W pixels and a simple demosaic processing unit 106. Pixel information of a single horizontal row of the RAW image is input and stored in the FIFO buffer 105 until pixels for a subsequent horizontal row is input in the demosaicing unit 104a. Upon receipt of the pixels for the two horizontal rows, the simple demosaic processing unit 106 performs, using the received pixels, a demosaic process of complementing color information for each pixel based on the surrounding pixels thereof and then creating a full-color image.

As known to a skilled person, there are many methods for this demosaic process. However, a simple demosaic process that uses only the pixels for two horizontal rows is sufficient in this case. As an example, when a pixel for which a corresponding YCbCr value is to be calculated has only a G value, an RGB value is obtained by taking an average of the respective R values of right and left adjacent pixels, using the G value of the pixel, using the B value of above or below adjacent pixel, respectively, and then substituted into a predetermined conversion equation so as to calculate the YCbCr value. Since such a demosaic process is well known, a further detailed explanation thereof is omitted. A color space of image data that is generated by the demosaicing unit 104 or in a subsequent process is not limited to YCbCr.

The reason for why a simple demosaic process is sufficient is because the RAW image can be used when a high-quality image is necessary. In one variation of a simple demosaic process, a method of forming a YCbCr value of a single pixel from four pixels of RGB may be used. In this case, a demosaiced image of ¼ the size of the RAW image can be obtained. Thus, a first filter 110a described later is not necessary.

As shown in the figure, the simple demosaic processing unit 106 converts RGB of four pixels, which are two horizontal pixels by two vertical pixels, into YCbCr color signals, for example. A block composed of these four pixels is transferred to the image synthesis unit 30 as a ⅟₁ demosaic image and is also transmitted to the pyramid filter unit 135a.

The pyramid filter unit 135a has a function of hierarchizing a given image into a plurality of resolutions and outputting the hierarchized image. A pyramid filter is, in general, provided with ¼ reduction filters of which number is according to the necessary level of resolution. In the present embodiment, the pyramid filter has three-level filters: a first filter 110a through a third filter 130a. Each filter performs a process of bilinear interpolation of four pixels that are adjacent to one another and then computing an average pixel value of the four pixels. Therefore, an image size obtained after the process becomes ¼ the size of the image before the process. A person skilled in the art should easily appreciate that the same applies even when filters other than three-level filters are used.

Before the first filter 110a, a single FIFO buffer 112 for W pixels is correspondingly provided for each of Y, Cb, and Cr signals. These FIFO buffers 112 each have a role of storing YCbCr pixels for a single horizontal row until pixels for a subsequent horizontal row are output from the simple demosaic processing unit 106. The storage time of the pixels is determined according to the speed of line scanning of an imaging element. Upon the input of the pixels for two horizontal rows, the first filter 110a averages Y, Cb, and Cr pixel values for four pixels of two horizontal pixels by two vertical pixels. By repeating this process, the length of a ⅟₁ demosaiced image becomes ½ both vertically and horizontally such that the image is converted to have ¼ the size as a whole. The converted ¼ demosaiced image is transmitted to the image synthesis unit 30 and is also transferred to the subsequent second filter 120a.

Before the second filter 120a, a single FIFO buffer 122 for W/2 pixels is correspondingly provided for each of Y, Cb, and Cr signals. These FIFO buffers 122 each also have a role of storing YCbCr pixels for a single horizontal row until pixels for a subsequent horizontal row are output from the first filter 110a. Upon the input of the pixels for two horizontal rows, the second filter 120a averages Y, Cb, and Cr pixel values for four pixels of two horizontal pixels by two vertical pixels. By repeating this process, the length of the ¼ demosaiced image becomes ½ both vertically and horizontally such that the image is converted to be 1/16 the size as a whole. The converted 1/16 demosaiced image is transmitted to the image synthesis unit 30 and is also transferred to the subsequent third filter 130a.

In front of the third filter 130a, FIFO buffers 132 for W/4 pixels are provided. Other than this, the same processes as those described above are repeated. A demosaiced image of 1/64 the size is then transmitted to the image synthesis unit 30. Since a pyramid filter such as those shown above is well known, as described in patent document No. 1, a further detailed explanation thereof is omitted in the subject specification.

As described, outputs of images that have been reduced to be ¼ one by one are input to the image synthesis unit 30 from the respective filters of the pyramid filter unit 135a. As is evident from this, the size of a FIFO buffer that is necessary before each filter becomes smaller as the number of passed filters becomes large in the pyramid filter unit 135a. The number of the filters is not limited to three and may be determined appropriately depending on a resolution range that is required.

Since the second camera 22b of the imaging device 12 is configured in a similar manner to that of the first camera 22a, the illustration thereof is omitted. However, in the following explanation, an image acquisition unit, a demosaicing unit, a pyramid filter unit, a first filter, a second filter, and a third filter of the second camera 22b will be referred to with reference numerals, namely, as an image acquisition unit 102b, a demosaicing unit 104b, a pyramid filter unit 135b, a first filter 110b, a second filter 120b, and a third filter 130b.

FIG. 4 shows the detailed configuration of the image synthesis unit 30 and the image transmission unit 32. The image synthesis unit 30 includes an output timing adjusting unit 140, and FIFO buffers 172a, 174a, 176a, 170b, 172b, 174b, and 176b. The output timing adjusting unit 140 adjusts output timing of image data of each size, which is transmitted from the first camera 22a or from the second camera 22b and output to the image transmission unit 32. The FIFO buffers 172a, 174a, 176a, 170b, 172b, 174b, and 176b are used for adjusting the output timing. Although each piece of data on Y, Cb, Cr are represented separately, and arrows for input/output of the data are indicated for each of the pieces of data in FIG. 3, these elements will hereinafter be represented as one set in order to prevent the figures from becoming complicated.

The FIFO buffers 172a, 174a, and 176a stores YCbCr pixel values of pixels in a single horizontal row of a ¼, 1/16, and 1/64 demosaiced image sent from the first filter 110a, the second filter 120a, and the third filter 130a of the first camera 22a, respectively. Therefore, the FIFO buffers 172a, 174a, and 176a are buffers that store pixel values of W/2, W/4, and W/8 pixels, respectively.

The FIFO buffers 170b, 172b, 174b, and 176b store YCbCr pixel values of pixels in a single horizontal row of a ¹⁄₁, ¼, 1/16, and 1/64 demosaiced image sent from the demosaicing unit 104b, the first filter 110b, the second filter 120b, and the third filter 130b of the second camera 22b, respectively. Therefore, the FIFO buffers 170b, 172b, 174b, and 176b are buffers that store pixel values of W, W/2, W/4, and W/8 pixels, respectively.

After outputting pixel values for a single horizontal row of the ¹⁄₁ demosaiced image sent from the demosaicing unit 104a of the first camera 22a to the image transmission unit 32, the output timing adjusting unit 140 outputs pixel values for a single horizontal row of the ¹⁄₁ demosaiced image of the second camera 22b, the pixel values having been stored in the FIFO buffer 170b. Thereafter, by outputting a row of pixels for a single horizontal row or row of pixels for an area smaller than a single horizontal row in accordance with a rule that will be described in detail later, the output timing adjusting unit 140 adjusts output timing so that new rows of pixels wherein rows of pixels of ¹⁄₁, ¼, 1/16, and 1/64 demosaiced images are cyclically connected for respective pixel values of Y, Cb, and Cr are generated.

As described above, a process executed by the imaging device 12 in accordance with the present embodiment is performed in raster order where the starting point is at the upper left of an image and a process from left to right is repeated downward, where the basic unit of the process is a single horizontal row of pixels. The input/output of image data from each camera to the image transmission unit 32, and the transmission of image data to the host terminal 20 are basically performed in a streaming format where pixel values for each single horizontal row of an image is connected in sequence from the top.

Data output from the image synthesis unit 30 is also a stream of a succession of pixel values containing the mixture of rows of pixels of demosaiced images where right and left frame images are represented in four resolutions respectively. Therefore, it is not that a result of connecting eight demosaiced images is generated as a two dimensional image, in a precise sense. However, as will be described later, with respect to a stream output from the image synthesis unit 30, if the number of pixels of rows of pixels at the time when the connection of respective demosaiced images loops back to its starting point is defined as the number of pixels for a single horizontal row of an image, the subsequent process will be similar to a process for a RAW image without involving image synthesis unit 30. As a result, the image synthesis unit 30 generates substantially an image that is a synthesis of ¹⁄₁, ¼, 1/16, and 1/64 demosaiced images. Herein after, this virtual image is referred to as a "synthesized image."

The image transmission unit 32 includes a control unit 142, a data selection unit 144, and a packetizing unit 146. Based on a request signal from the host terminal 20, the control unit 142 instructs the data selection unit 144 which of various types of image data is to be transmitted as a packet. The control unit 142 further receives from the host terminal 20 a signal requesting the start or end of image capturing, a signal specifying an image capturing condition, or the like, and provides the information thereof to the image acquisition units 102a, 102b, or the like of the first camera 22a and the second camera 22b as appropriate. However, a detailed explanation thereon is omitted, since commonly-used technologies can be applied thereto.

The data selection unit 144 defines as input data: data on a row of pixels of right and left RAW images input from the image acquisition unit 102a of the first camera 22a and from the image acquisition unit 102b of the second camera 22b; and data on a row of pixels of a synthesized image input from the image synthesis unit 30. Then the data selection unit 144 selects and extracts data instructed by the control unit 142 and sends the data to the packetizing unit 146.

The data selection unit 144 includes a stream selection unit 148 and a cropping unit 150. The stream selection unit 148 selects a requested stream from streams of the right and left RAW images and the synthesized image. In the case that the host terminal 20 requests one of the demosaiced images, the cropping unit 150 acquires a stream of the synthesized image from the stream selection unit 148, and crops the required row of pixels from rows of pixels of demosaiced images included in the stream.

In the case that a plurality of demosaiced images are requested, the cropping unit 150 crops rows of pixels corresponding to the plurality of images, concurrently. By connecting respective pieces of data of the cropped rows of pixels, the cropping unit 150 reconstructs a stream and sends the stream to the packetizing unit 146. In the case that the host terminal 20 requests a RAW image, the stream selection unit 148 sends a stream of a RAW image directly to the packetizing unit 146.

The packetizing unit 146 packetizes, for each size according to a protocol of the communication unit 34, a stream that has been input from the data selection unit 144 and writes the packetized stream in an internal packet buffer (not shown). For example, in the case of a USB, the packetizing unit 146 packetizes a stream for each size of an end point. The communication unit 108 transmits the packets in the packet buffer to the host terminal 20 in accordance with a predetermined communication protocol.

Figure 5:
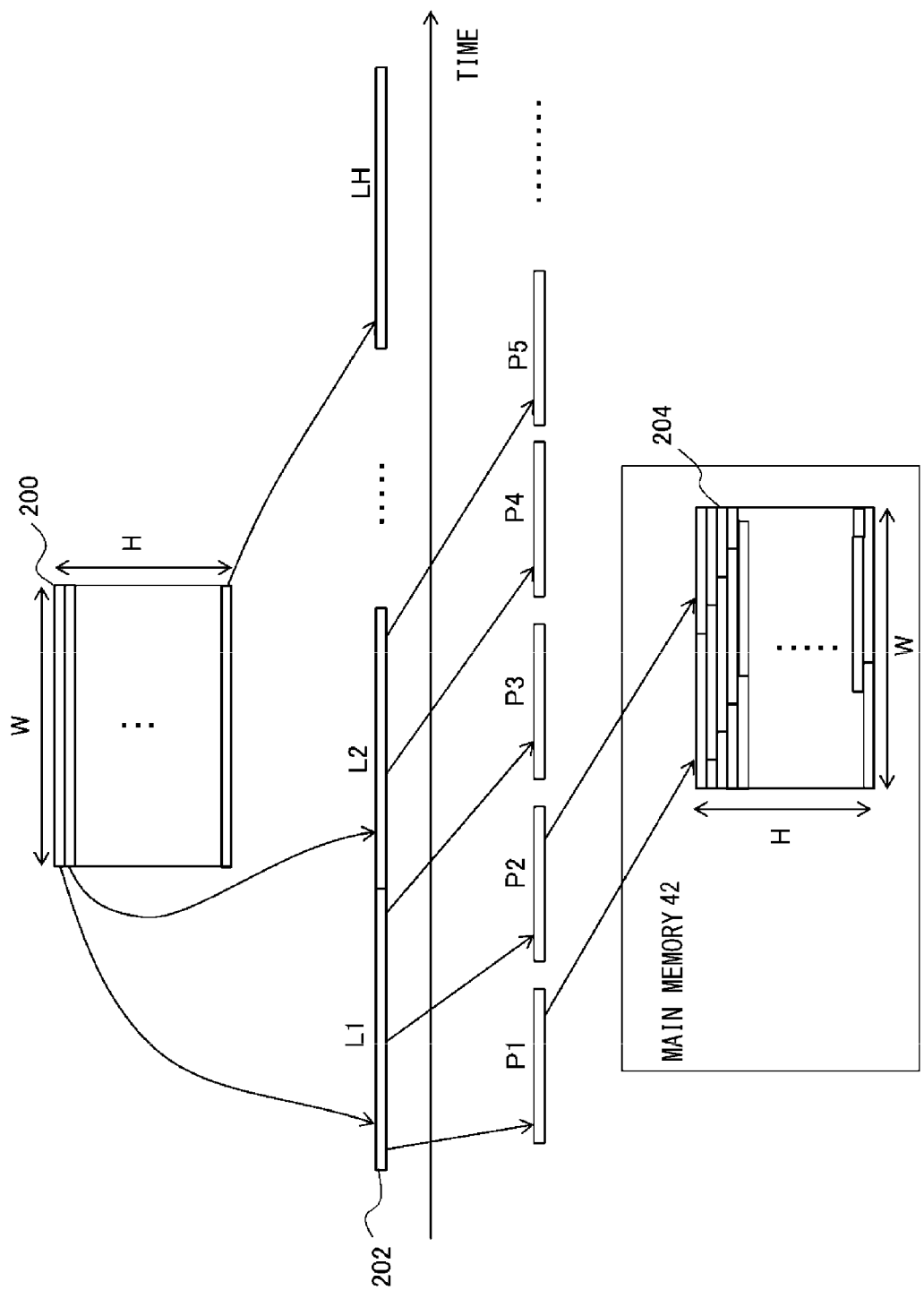
FIG. 5 schematically shows a basic transition of the form of data in the imaging device and the host terminal according to the present embodiment.

FIG. 5 schematically illustrates a basic transition of the form of data in the imaging device 12 and the host terminal 20. In this case, as an example, a situation is considered where data of an entire frame image 200 having a width of "W" pixels in a horizontal direction and a width of "H" pixels in a vertical direction is transmitted to the host terminal 20 from the imaging device 12. As described above, the generation, selection, and transmission of image data are performed in raster order of pixels, and rows of pixels each for a single horizontal row are sequentially connected and processed in a stream format in the present embodiment.

Data that is output by the data selection unit 144 under such a situation is a stream 202. In the figure, the horizontal axis of the stream 202 represents the passage of time, and rectangles L1, L2, . . . , and LH, which constitute the stream 202, represent respective pieces of data of pixels of a first row, pixels of a second row, . . . , and pixels of an Hth row of the frame image 202. When the data size of a single pixel is assumed to be d byte, the data size of each rectangle is W*d bytes.

The packetizing unit 146 groups and packetizes the stream 202 for each predetermined size and generates packets P1, P2, P3, P4, P5, . . . . With this, the packets are sent from the imaging device 12 to the host terminal 20 in the order P1, P2, P3, P4, P5, . . . . Upon receiving the packets P1, P2, P3, P4, P5, . . . via the communication unit 44, the host terminal 20 stores data of respective packets into the main memory 42 under the control of the information processing unit 38.

In this process, the data of respective packets are arranged in the main memory 42 in raster order so that the number of pixels W in the horizontal direction of the original frame image 200 is set as the width. By deploying the data in consecutive addresses of W*d*H bytes, an image 204, which is a reconstruction of the frame image 200 is generated. The rectangles constituting the image 204 in the figure indicate data of respective packets. The image processing unit 40 renders an image to be displayed on the display device 16 by processing the image 204 that has been deployed in the main memory 42, by synthesizing the image 204 with another image, etc.

Figure 6:
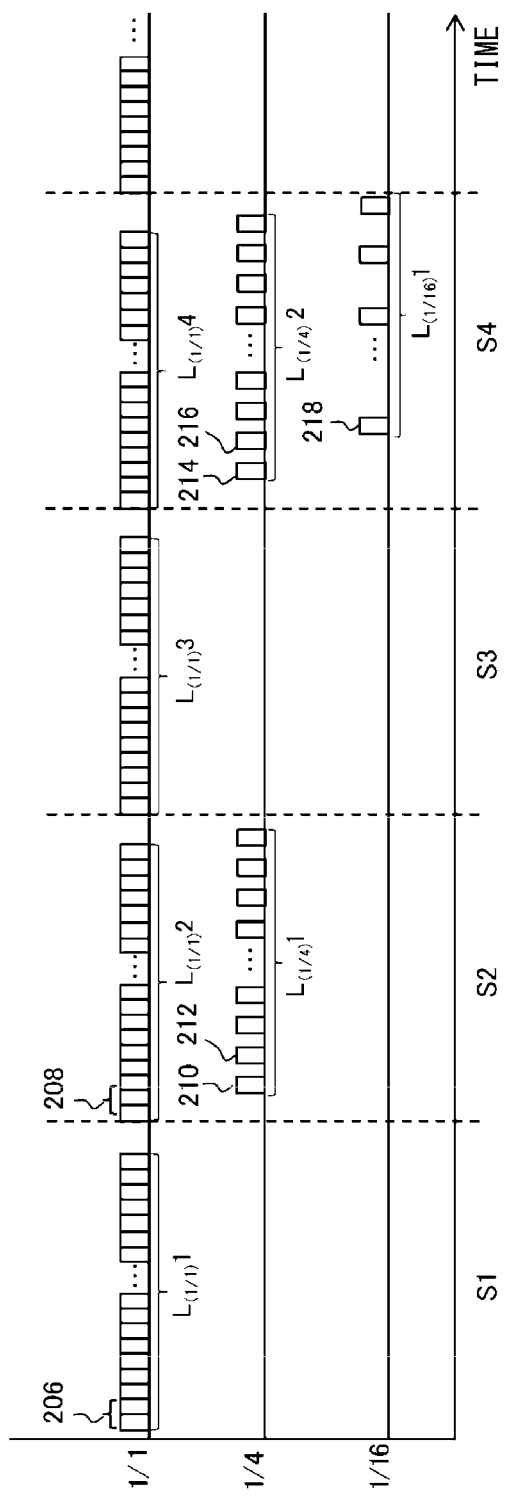
FIG. 6 is a time chart illustrating input timing of respective pixel values of a ¼ demosaiced image, a ¹⁄₁₆ demosaiced image, and a ¹⁄₆₄ demosaiced image from a pyramid filter unit according to the present embodiment.
Figure 7:
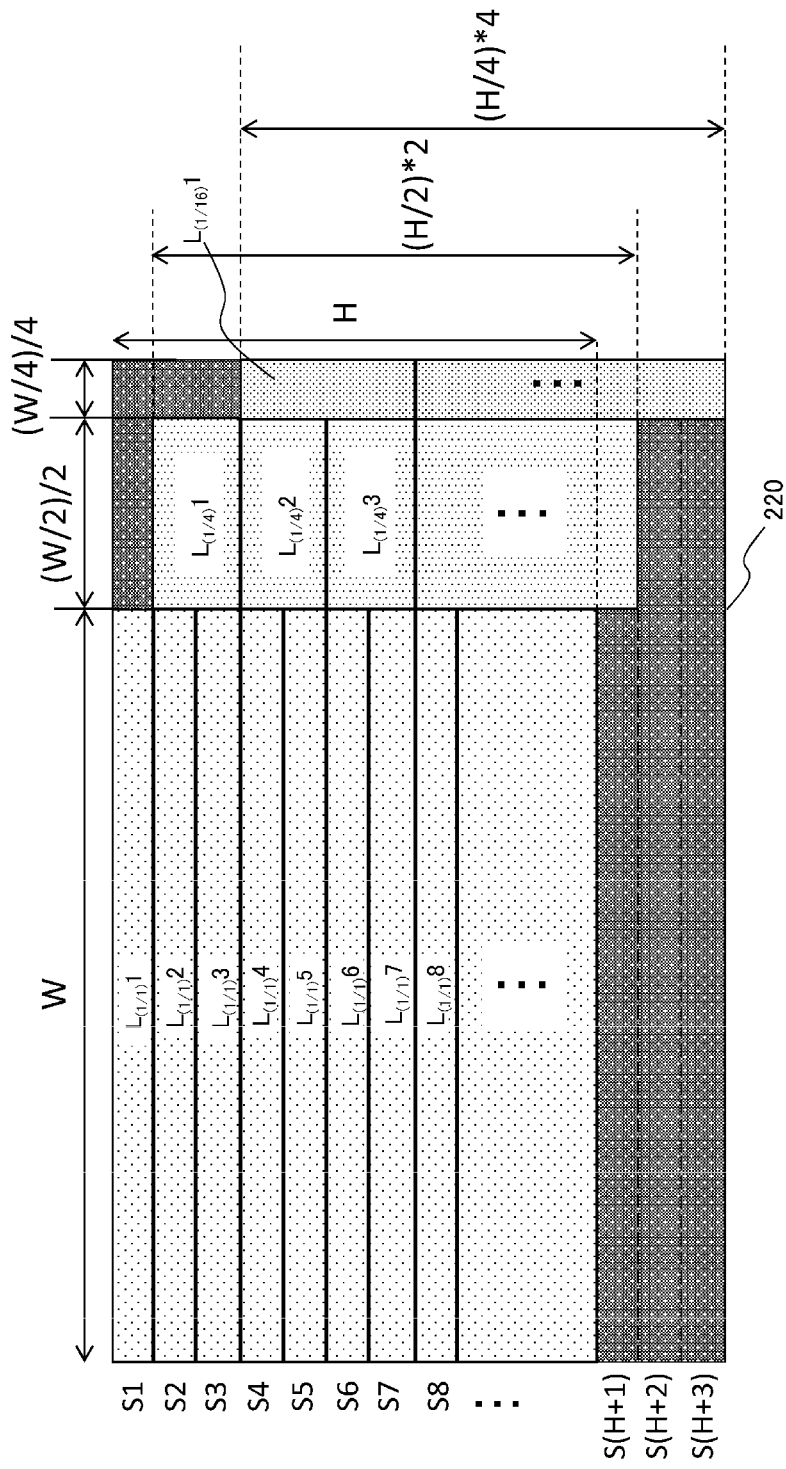
FIG. 7 schematically shows a state where the image synthesis unit connects pieces of data of rows of pixels of a plurality of images in accordance with the present embodiment.

Next, an explanation will be given on method by which the image synthesis unit 30 synthesizes demosaiced images of different resolutions. Although three types of demosaiced images of $1/1$, $1/4$, and $1/16$ are indicated in FIGS. 6 and 7, the same principle applies to a case where a demosaiced image of $1/64$ or smaller is added. FIG. 6 is a time chart illustrating timing for respective pixel values of a $1/1$ demosaiced image, a $1/4$ demosaiced image, and a $1/16$ demosaiced image to be input from respective filters of the pyramid filter unit 135a. The time steps S1, S2, S3, S4, . . . in the figure indicate periods where pixel values of the first row, the second row, the third row, the fourth row, . . . of the $1/1$ demosaiced image are input, respectively.

As in the case of the $1/1$ demosaiced image indicated above, an image with the highest resolution among images included in a synthesized image has the highest data generation rate in the pyramid filter unit 135a. Thus, a period in which pixel values for a single horizontal row of the image with the highest resolution are input is set to be a reference time step, and the time step is associated with a row of pixels for a single horizontal row of the synthesized image. In other words, data for a single horizontal row of the synthesized image is generated during a period in which pixel values for a single horizontal row of the image with the highest resolution are input, as a reference cycle.

The upper row, the middle row, and the lower row of the figure show input timing of a $1/1$ demosaiced image, input timing of a $1/4$ demosaiced image, and input timing of a $1/16$ demosaiced image, respectively, and a single rectangle corresponds to input for a single pixel. First, in the time step S1, pixel values of a pixel row $L_{(1/1)}1$ of the first row of the $1/1$ demosaiced image are input starting from the left pixel. In this time step, the $1/4$ demosaiced image and the $1/16$ demosaiced image are not generated and are thus not input.

Then, in the next time step S2, pixel values of a pixel row $L_{(1/1)}2$ of the second row of the $1/1$ demosaiced image are input starting from the left pixel. At this time, a pixel row $L_{(1/4)}1$ of the first row of the $1/4$ demosaiced image is generated in the pyramid filter unit 135a using pixel values of the pixel row $L_{(1/1)}1$ of the first row and pixel values of the pixel row $L_{(1/1)}2$ of the second row of the $1/1$ demosaiced image. Thus, pixel values of the pixel row are also input in the time step S2.

For example, pixel values that are input in a period 210 at the left end of the pixel row $L_{(1/4)}1$ of the first row of the $1/4$ demosaiced image are generated using both the pixel values of two pixels that are input in a period 206 in the pixel row $L_{(1/1)}1$ of the first row of the $1/1$ demosaiced image and the pixel values of two pixels that are input in a period 208 in the pixel row $L_{(1/1)}2$ of the second row. Therefore, in the time step S2, input timing of pixel values of the pixel row $L_{(1/4)}1$ is delayed by at least two pixels in comparison with input timing of pixel values of corresponding pixels of the pixel row $L_{(1/1)}2$.

In the subsequent time step S3, pixel values of a pixel row $L_{(1/1)}3$ of the third row of the $1/1$ demosaiced image are input. In this time step, pixel values of the second row of the $1/4$ demosaiced image are not generated, and the $1/16$ demosaiced image is not generated either. Thus, neither of them is input. In the subsequent time step S4, that is, in a period in which pixel values of a pixel row $L_{(1/1)}4$ of the fourth row of the $1/1$ demosaiced image are input, pixel values of a pixel row $L_{(1/4)}2$ of the second row of the $1/4$ demosaiced image are also input as in the case of the time step S2.

Furthermore, a pixel row $L_{(1/16)}1$ of the first row of a $1/16$ demosaiced image is generated in the pyramid filter unit 135a using pixel values of the pixel row $L_{(1/4)}1$ of the first row and pixel values of the pixel row $L_{(1/4)}2$ of the second row of the $1/4$ demosaiced image. Thus, pixel values of the pixel row are also input in the time step S4. For example, pixel values that are input in a first period 218 in a pixel row $L_{(1/16)}1$ of the first row of the 1/16 demosaiced image are generated using both the pixel values of two pixels that are input in periods 210 and 212 in the pixel row $L_{(1/4)}1$ of the first row of the 1/4 demosaiced image and the pixel values of two pixels that are input in periods 214 and 216 in the pixel row $L_{(1/4)}2$ of the second row.

Therefore, in the time step S4, input timing of the pixel row $L_{(1/16)}1$ becomes delayed by at least two pixels compared to input timing of pixel values of corresponding pixels in the pixel row $L_{(1/4)}2$. Hereinafter, by repeating the input of the pixel values of the respective images in the same way, all the pixel values of the 1/1 demosaiced image, the 1/4 demosaiced image, and the 1/16 demosaiced image are input to the image synthesis unit 30.

As described above, the pixel values of the respective images are input in raster order as individual streams from corresponding filters of the pyramid filter unit 135a of the first camera 22a, the pyramid filter unit 135b of the second camera 22b. The image synthesis unit 30 connects these streams to form a single stream and outputs the stream to the image transmission unit 32. The simplest possible way is to connect respective pieces of data of the pixel values in order of input time regardless of the original images. In this case, although a synthesis process itself is easy, sorting and extraction of the pieces of data for each single row are necessary for each of the images in subsequent processes, and the processes thus become complicated.

It is also possible to collect pixel values for each of the images in each time step so as to form pixel rows and then connect those pixel rows in series. In this case, while pixel values that are input in the time steps S1 and S3 are only data of the 1/1 demosaiced image, those that are input in, e.g., the step S4 are data of the three images: the 1/1 demosaiced image; the 1/4 demosaiced image; and the 1/16 demosaiced image. As described, the length of data that is output varies greatly depending on a time step. Thus, for images with time steps during which data is not input, some pixel values that have been input the most recently are output using the time steps so as to almost equalize the length of data that is output in each of the time steps in the present embodiment.

FIG. 7 schematically shows a state where the image synthesis unit 30 connects respective pieces of data of rows of pixels of a plurality of images. Although the figure indicates a state where three types of demosaiced images shown in FIG. 6 are connected in order to facilitate the understanding, image data from the right and left cameras are connected alternately in practice as will be described later. In the figure, steps S0, S1, S2, S3, . . . , are time steps similar to those shown in FIG. 6, and pixel values of a single row of the 1/1 demosaiced image is input in each period.

The figure shows, in a different shaded rectangle for each of the images, a pixel row for which data is output in each time step. As explained in reference to FIG. 6, in the time step S1, only the pixel values of a pixel row $L_{(1/1)}1$ of the first row of the 1/1 demosaiced image are input, and the image synthesis unit 30 thus outputs the pixel values directly. When the pixel value of the original RAW image in the horizontal direction is set to be W, the number of pixels for a single row of the 1/1 demosaiced image is also W as shown in the figure.

In the subsequent time step S2, the pixel values of the pixel row $L_{(1/1)}2$ of the second row of the 1/1 demosaiced image and the pixel values of the pixel row $L_{(1/4)}1$ of the first row of the 1/4 demosaiced image are input in parallel at the timing shown in FIG. 6. Of those pixel values, the image synthesis unit 30 temporarily stores the pixel values of the pixel row $L_{(1/4)}1$ of the first row of the 1/4 demosaiced image in the FIFO buffer 172a and sequentially outputs the pixel values of the pixel row $L_{(1/1)}2$ of the second row of the 1/1 demosaiced image first.

Upon completion of the outputting of all the pixel values of the pixel row $L_{(1/1)}2$ of the second row of the 1/1 demosaiced image, the image synthesis unit 30 successively reads the pixel row $L_{(1/4)}1$ of the first row of the 1/4 demosaiced image from the FIFO buffer 172a and outputs the pixel row $L_{(1/4)}1$. At this time, in consideration of the amount of pixel values that is to be output in the subsequent time step S3, the image synthesis unit 30 outputs only the pixel values of the first half (left half in the image plane) of all the pixels of the pixel row $L_{(1/4)}1$ of the first row of the 1/4 demosaiced image and continues to store the rest in the FIFO buffer 172a.

In the subsequent time step S3, only pixel values of the pixel row $L_{(1/1)}3$ of the third row of the 1/1 demosaiced image are input. The image synthesis unit 30 directly outputs the pixel values of the pixel row. Subsequently, the image synthesis unit 30 reads the pixel values of the last half (right half in the image plane), which have not been output, of the pixel row $L_{(1/4)}1$ of the first row of the 1/4 demosaiced image from the FIFO buffer 172a and outputs the pixel values.

In the subsequent time step S4, the pixel values of the pixel row $L_{(1/1)}4$ of the fourth row of the 1/1 demosaiced image and the pixel values of the pixel row $L_{(1/4)}2$ of the second row of the 1/4 demosaiced image and the pixel row $L_{(1/16)}1$ of the first row of the 1/16 demosaiced image are input in parallel at the timing shown in FIG. 6. Of those pixel values, the image synthesis unit 30 temporarily stores the pixel values of the pixel row $L_{(1/4)}2$ of the second row of the 1/4 demosaiced image and the pixel values of the pixel row $L_{(1/16)}1$ of the first row of the 1/16 demosaiced image in the FIFO buffers 172a and 174a, respectively, and sequentially outputs the pixel values of the pixel row $L_{(1/1)}4$ of the fourth row of the 1/1 demosaiced image first.

Upon completion of the outputting of all the pixel values of the pixel row $L_{(1/1)}4$ of the fourth row of the 1/1 demosaiced image, the image synthesis unit 30 successively reads the first half of the pixel row $L_{(1/4)}2$ of the second row of the 1/4 demosaiced image from the FIFO buffer 172a and outputs the first half of the pixel row $L_{(1/4)}2$. Then, the image synthesis unit 30 outputs the pixel row $L_{(1/16)}1$ of the first row of the 1/16 demosaiced image. At this time, in consideration of the amount of pixel values that is to be output in the following three time steps S5, S6, and S7, the image synthesis unit 30 divides the pixel row $L_{(1/16)}1$ of the first row of the 1/16 demosaiced image into four quarters and outputs only the pixel values of the first quarter. The image synthesis unit 30 stores the rest in the FIFO buffer 174a.

In the subsequent time step S5, only pixel values of a pixel row $L_{(1/1)}5$ of the fifth row of the 1/1 demosaiced image are input. The image synthesis unit 30 directly outputs the pixel values of the pixel row. Subsequently, the image synthesis unit 30 reads the pixel values of the last half, which have not been output, of the pixel row $L_{(1/4)}2$ of the second row of the 1/4 demosaiced image from the FIFO buffer 172a and outputs the pixel values. Furthermore, the image synthesis unit 30 outputs the pixel values of the second quarter of the data, which has not been output and has been divided into four quarters, of the pixel row $L_{(1/16)}1$ of the first row of the 1/16 demosaiced image.

Similarly, in the subsequent time step S6, the image synthesis unit 30 outputs the pixel values of a pixel row $L_{(1/1)}6$ of the sixth row of the 1/1 demosaiced image, the pixel values of the first half of the pixel row $L_{(1/4)}3$ of the third row of the ¼ demosaiced image, and the pixel values of the third quarter of the data, which has not been output and has been divided into four quarters, of the pixel row $L_{(1/16)}1$ of the first row of the ¹⁄₁₆ demosaiced image. In the subsequent time step S7, the image synthesis unit 30 outputs the pixel values of a pixel row $L_{(1/1)}7$ of the seventh row of the ¹⁄₁ demosaiced image, the pixel values of the last half of the pixel row $L_{(1/4)}3$ of the third row of the ¼ demosaiced image, and the pixel values of the last quarter of the data, which has been divided into four quarters, of the pixel row $L_{(1/16)}1$ of the first row of the ¹⁄₁₆ demosaiced image.

In other words, the pixel row $L_{(1/4)}1$ of the first row of the ¼ demosaiced image is output one half each in the two time steps S2 and S3. The pixel row $L_{(1/16)}1$ of the first row of the ¹⁄₁₆ demosaiced image is output one fourth each in the four time steps S4, S5, S6, and S7. When the number of pixels of the RAW image in the horizontal direction is W, the number of pixels of a single horizontal row of the ¼ demosaiced image and the number of pixels of a single horizontal row of the ¹⁄₁₆ demosaiced image are W/2 and W/4, respectively. Thus, as shown in the figure, data for (W/2)/2 pixels and data for (W/4)/4 pixels are output each per time step, respectively.

The above output processes are repeated through the respective bottom rows of the images. In this case, at the time the data for the bottom pixel row of the ¹⁄₁ demosaiced image is output, the data for the last half of the bottom pixel row of the ¼ demosaiced image and the data for the remaining three-fourths of the pixels of the bottom row of the ¹⁄₁₆ demosaiced image are not yet output. Thus, in a time step S(H+1) that follows immediately, the image synthesis unit 30 outputs the data for the last half of the bottom pixel row of the ¼ demosaiced image and the data for the second quarter of the bottom pixel row, which has been divided into four quarters, of the ¹⁄₁₆ demosaiced image.

At this time, the image synthesis unit 30 first outputs invalid data as data for W pixels, for which the data of the ¹⁄₁ demosaiced image has been output until this time, and then outputs the data of the ¼ demosaiced image and the data of the ¹⁄₁₆ demosaiced image. In the following two time steps S(H+2) and S(H+3), the image synthesis unit 30 first outputs invalid data as data for W+(W/2)/2 pixels, for which the data of the ¹⁄₁ demosaiced image and the data for the ¼ demosaiced image have been output until that time, and then outputs the respective pieces of data of the third and fourth quarters of the bottom pixel row, which has been divided into four quarters, of the ¹⁄₁₆ demosaiced image.

As shown in the figure, data for [W+(W/2)/2+(W/4)/4=21W/16] pixels is output at all time steps except for the first three time steps and the last three time steps, when the outputting is performed as described above. To output pixel values for a single row, it requires one time step for the ¹⁄₁ demosaiced image, two time steps for the ¼ demosaiced image, and four steps for the ¹⁄₁₆ demosaiced image. Thus, the number of time steps required for outputting image data for a single frame is identical for all as follows: H=(H/2)*2=(H/4)*4. As a result, the total number of time steps required for outputting data of the three types of images representing a single frame is H+3.

As described above, data that is output by the image synthesis unit 30 is a row of pixel values. By providing in advance the number of pixels that correspond to each time step, i.e., 21W/16, as the number of pixels of a single horizontal row, the image transmission unit 32 treats data that is output in each time step as data for a single row of an image as in the case of the RAW image.

Therefore, by mapping each time step to pixels of an image in the vertical direction, the outputting process becomes equivalent to a generation process of a synthesized image 220 shown by an overall rectangular area in FIG. 7. By fixing a range occupied by the data of each image in a pixel row that is output in each time step, as described above, the data of the ¹⁄₁ demosaiced image, the data of ¼ demosaiced image, and the data of the ¹⁄₁₆ demosaiced image each forms a rectangular block area in the synthesized image 220. Therefore, segmentation of data on an image-by-image basis can be easily performed using the locality.

Figure 8:
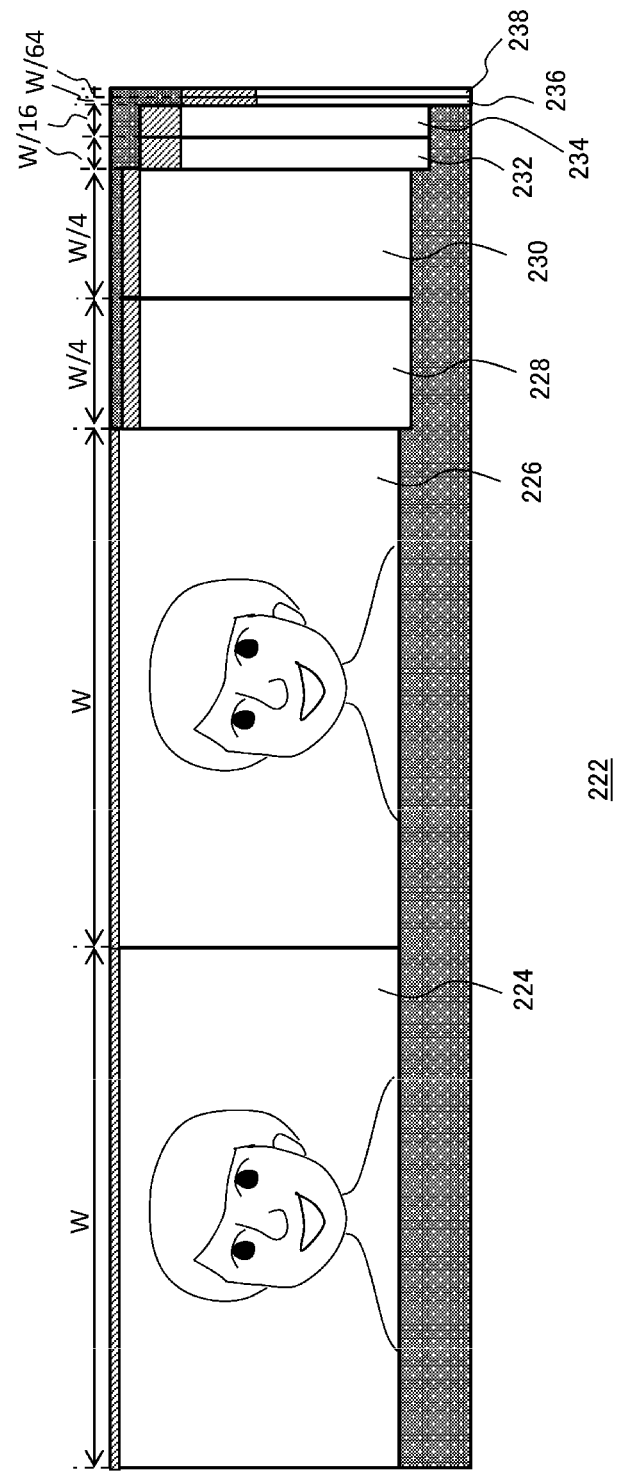
FIG. 8 shows a synthesized image generated in the case that a process explained while referring to FIG. 7 is repeated alternately for each piece of image data output from a first camera or output from a second camera.

FIG. 8 shows a synthesized image generated when the process explained while referring to FIG. 7 is alternately repeated for data on each image output from the first camera 22a and from the second camera 22b. The synthesized image 222 comprises a ¹⁄₁ demosaiced image 224 by the first camera 22a, a ¹⁄₁ demosaiced image 226 by the second camera 22b, ¼ demosaiced image 228 by the first camera 22a, a ¼ demosaiced image 230 by the second camera 22b, ¹⁄₁₆ demosaiced image 232 by the first camera 22a, a ¹⁄₁₆ demosaiced image 234 by the second camera 22b, ¹⁄₆₄ demosaiced image 236 by the first camera 22a, and a ¹⁄₆₄ demosaiced image 238 by the second camera 22b.

A face of the user 1 captured from the right and from the left are represented in the ¹⁄₁ demosaiced images 224 and 226 in the figure, respectively. Other demosaiced images (i.e., the ¼ demosaiced images 228 and 230, the ¹⁄₁₆ demosaiced images 232 and 234, and the ¹⁄₆₄ demosaiced images 236 and 238) are images generated by: reducing the ¹⁄₁ demosaiced image thereof to ¼, ¹⁄₁₆, and ¹⁄₆₄, respectively; dividing a row of pixels in a single horizontal row into two, four, and eight segments, respectively; and arranging the divided rows of pixels in the vertical direction.

Therefore, an area of pixels for a single horizontal row in the ¹⁄₁ demosaiced images 224 and 226 corresponds to an area of pixels for two horizontal rows in the ¼ demosaiced images 228 and 230, to an area of pixels for four horizontal rows in the ¹⁄₁₆ demosaiced images 232 and 234, and to an area of pixels for eight horizontal rows in the ¹⁄₆₄ demosaiced images 236 and 238 in the synthesized image 222 as indicated as shaded areas in the top of respective images. In the figure, the width of a single row of pixels is illustrated wider than that of actual images in order to facilitate the explanation. Therefore, an area for invalid data is illustrated by a wide area. However, in practice, the area for invalid data corresponds to pixels of seven rows at its maximum and to 1 percent or less of the entire area of the synthesized image 222 in accordance with the principle explained with FIG. 7.

The cropping unit 150 of the image transmission unit 32 crops, from the synthesized image 222, only image data that is requested by the host terminal 20. The process performed by the cropping unit 150 is similar to a commonly-used cropping process of clipping a specified rectangular region in an image and eliminating unnecessary regions. According to the present embodiment, the cropping process is performed not for each image plane but for each horizontal row of pixels. However, if information on the number of pixels for a single horizontal row of a synthesized image is given in advance, two dimensional coordinates of an image plane are easily mapped to a one dimensional coordinate of a stream. Therefore, pixels to be clipped can be identified in a similar manner.

In the present embodiment, data on both right and left images of the ¹⁄₁ demosaiced image, the ¼ demosaiced image, the ¹⁄₁₆ demosaiced image, and the ¹⁄₆₄ demosaiced image are collected in rectangular areas on a synthesized image such as the ones shown in FIG. 8. Thus, the images can be easily segmented by this cropping process.

Figure 9:
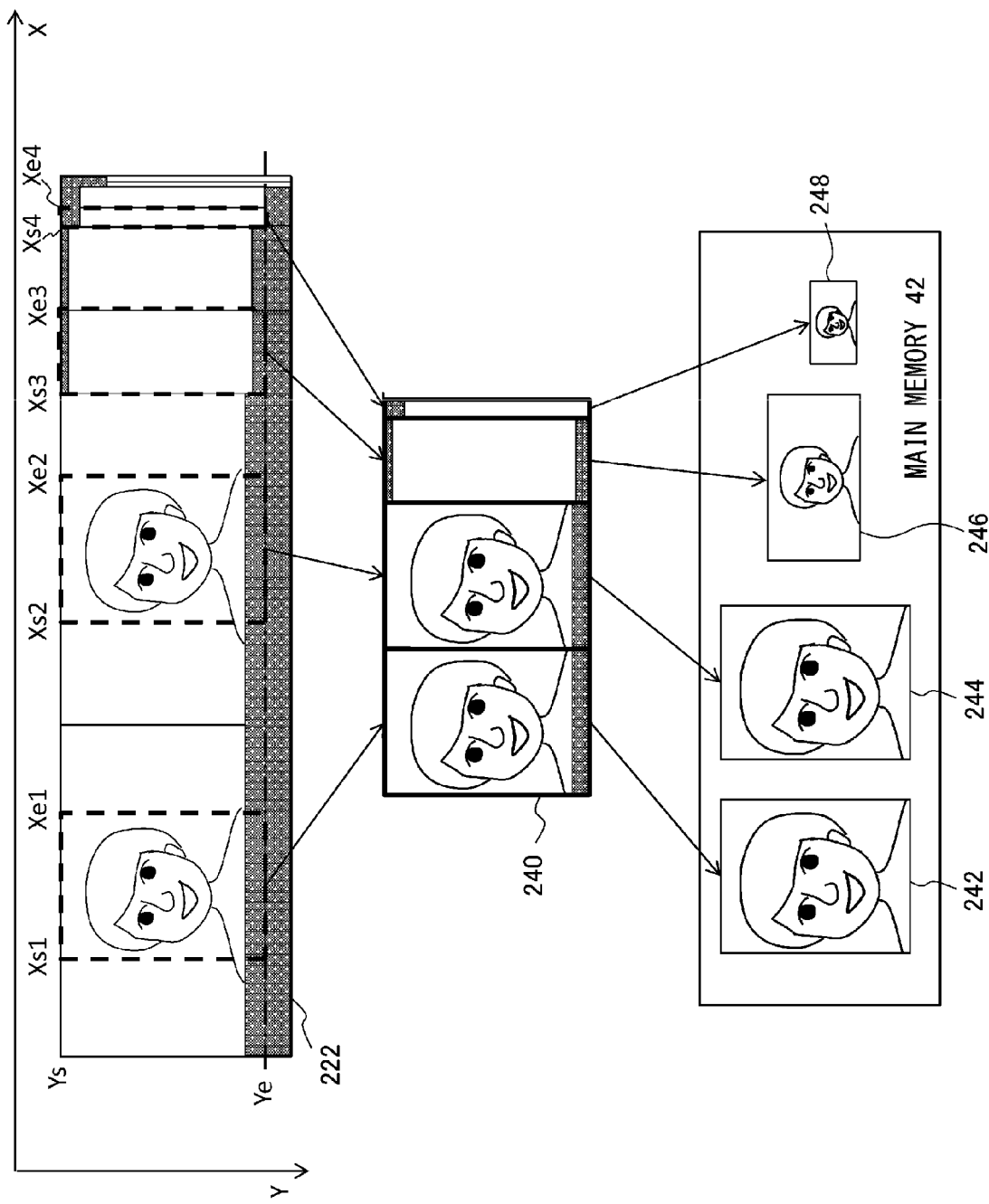
FIG. 9 schematically shows the flow of image data in response to a request from the host terminal in accordance with the present embodiment.

FIG. 9 schematically shows the flow of image data in response to a request from the host terminal 20. First, the host terminal 20 transmits a signal requesting data that specifies an area in the synthesized image to the imaging device 12. For example, a range of pixels in the vertical direction and a range of pixels in the horizontal direction in the synthesized image 222 are specified in this case.

In the example shown in FIG. 9, four areas are specified. The vertical (y-axis) range of the four areas are indicated by (minimum value, maximum value)=(Ys, Ye), and the horizontal (x-axis) ranges of the four areas are indicated by (minimum value, maximum value)=(Xs1, Xe1), (Xs2, Xe2), (Xs3, Xe3), and (Xs4, Xe4), respectively. The images in the ranges (Xs1, Xe1) and (Xs2, Xe2) are areas including a face and the surroundings of ⅓₁ demosaiced images of right and left cameras. The image in the range (Xs3, Xe3) is an entire ¼ demosaiced image of one of the cameras. The image in the range (Xs4, Xe4) is an entire ¹⁄₁₆ demosaiced image of one of the cameras.

The cropping unit 150 crops a synthesized image, which the image synthesis unit 30 has input for each row of pixels in a single horizontal row, into a specified area. More specifically, the cropping unit 150 cuts out rows of pixels in ranges (Xs1, Xe1), (Xs2, Xe2), (Xs3, Xe3), and (Xs4, Xe4) from the row of pixels located at the position Ys, and transmits the cut pixels to the packetizing unit 146 in series. Next, the cropping unit 150 cuts out rows of pixels in the same ranges from the row of pixels located at the position Ys+1, from the row of pixels located at the position Ys+2, . . . , in a similar manner, and transmits the cut pixels to the packetizing unit 146 in series. The packetizing unit 146 connects the cropped rows of pixels so as to form a stream and packetizes the stream sequentially.

As a result, image data received by the host terminal 20 is a stream of a new synthesized image 240 that consists only of cropped areas. The information processing unit 38 in the host terminal 20 cuts the stream into individual images and deploys the images upon consecutive addresses in the main memory 42. As a result, stored in the main memory 42 are: images 242 and 244 of the face and the surroundings included in the right and left ⅓₁ demosaiced images; an entire image 246 of the ¼ demosaiced image; and an entire image 248 of the ¹⁄₁₆ demosaiced image. Alternatively, the information processing unit 38 may directly deploy the synthesized image 240 in the main memory 42 and may differentiate the images when using the images for image processing or the like.

In this manner, the host terminal 20 can make requests for a plurality of types of images and a specific area in the images concurrently by specifying areas in a synthesized image. Then the cropping unit 150 crops a plurality of pieces of image data concurrently and generates a new stream that consists only of required image data by extracting pixel values in the specified range for each row of pixels.

In this mode, the host terminal 20 sets a common vertical range for a plurality of areas that are specified concurrently. In the example shown in FIG. 9, the vertical ranges for all specified four areas are set as (Ys, Ye). By setting the range in this manner, a same range to be extracted is set for all rows of pixels even if the cropping unit 150 extracts pixel values for each horizontal row of pixels in a synthesized image individually.

As a result, even if extracted pixels are connected so as to form a stream, the number of extracted pixels do not vary depending on the rows of pixels. Thus an image plane of a cropped rectangular area is reserved in the new synthesized image 240 intactly. With this, an acquired stream can be easily deployed into individual images on the basis of the number of pixels in the horizontal direction of each requested area in the host terminal 20.

Figure 10:
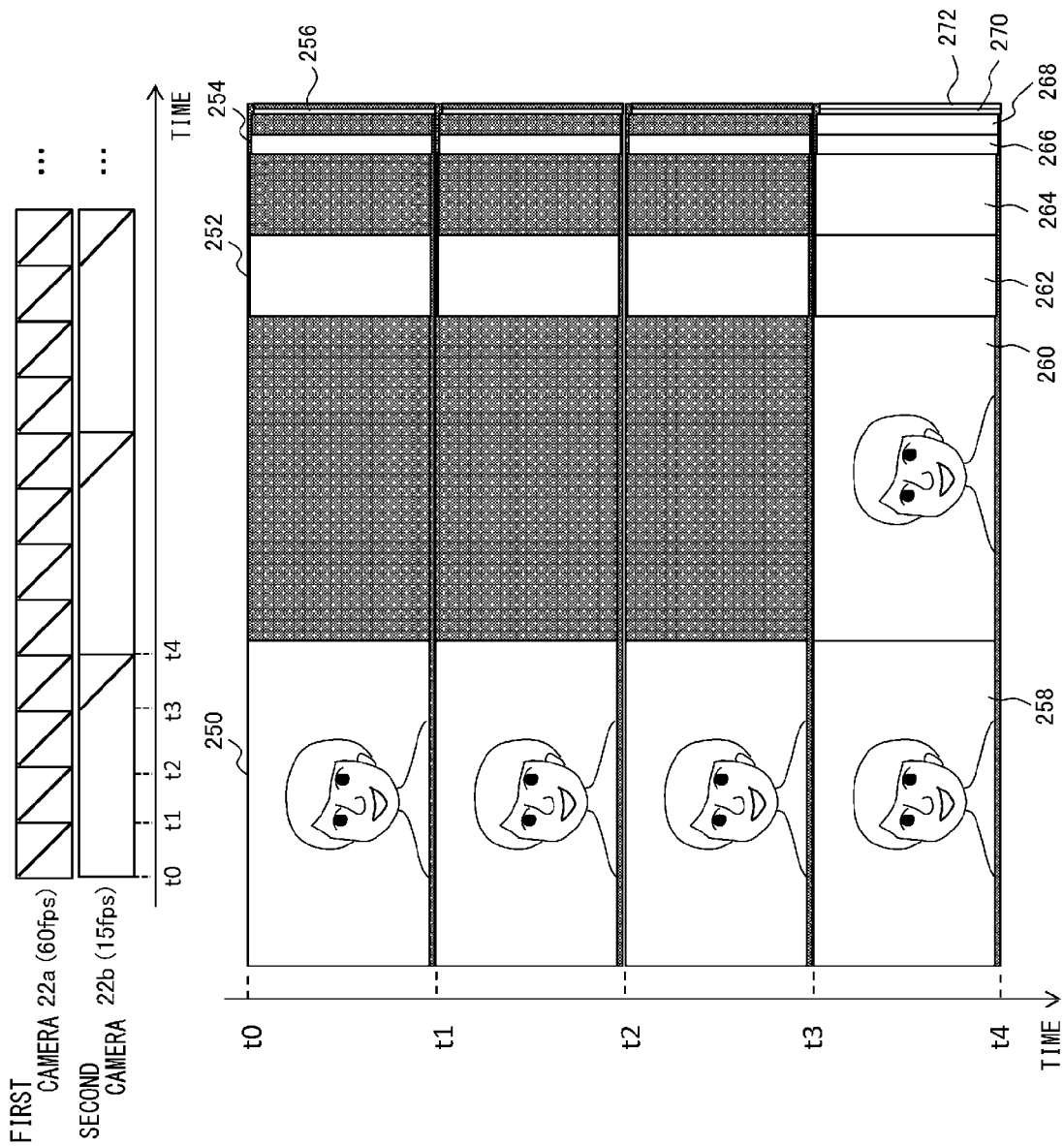
FIG. 10 shows a transition of an synthesized image generated by the image synthesis unit in the case that the first camera and the second camera provided with a rolling shutter capture images at different frame rates in accordance with the present embodiment.

Next, examples will be given to which the present embodiment is applied when the image capturing condition in the imaging device 12 is changed in various manners. FIG. 10 shows a transition of an synthesized image generated by the image synthesis unit 30 in the case that the first camera 22a and the second camera 22b, each provided with a rolling shutter, capture images at a frame rate of 60 fps and 15 fps respectively. The thick lines in the upper part of the FIG. 10 show the positions of scan lines for respective cameras with the passage of time. The second camera 22b captures one frame of image each time the first camera 22a captures four frames of images. These frame rates are just shown as an example, and any frame rates that satisfy the condition that the second camera 22b captures one frame each time the first camera 22a captures a predetermined number of frames more than one.

In this case, in a first shooting period (from time t0 to t1), a second shooting period (from time t1 to t2), and a third shooting period (from time t2 to t3) in which only the first camera 22a captures an image, only a ⅓₁ demosaiced image 250, a ¼ demosaiced image 252, a ¹⁄₁₆ demosaiced image 254, and a ¹⁄₆₄ demosaiced image 256 of a frame captured by the first camera 22a are output from the image synthesis unit 30 in series as shown in the figure. Then, in a fourth shooting period (from time t3 to t4) in which also the second camera 22b captures an image, ⅓₁ demosaiced images 258 and 260, ¼ demosaiced images 262 and 264, ¹⁄₁₆ demosaiced images 266 and 268, and ¹⁄₆₄ demosaiced images 270 and 272 of frames captured by both of the cameras are output.

Even in a period during which image data is not input from each filter of the second camera 22b, the image synthesis unit 30 adds invalid data in the amount of each demosaiced image to the stream when data from the second camera 22b is output. With this, as shown in the figure, the number of pixels for a single horizontal row of the synthesized image does not change for any of the periods, and a same type of image is disposed at a same position. As a result, the type of image data and an area on a synthesized image correspond with each other on a one-to-one basis. Thus, specifying of an area by the host terminal 20 can be simplified. Such transmission of image data is repeated also in the subsequent periods.

Figure 11:
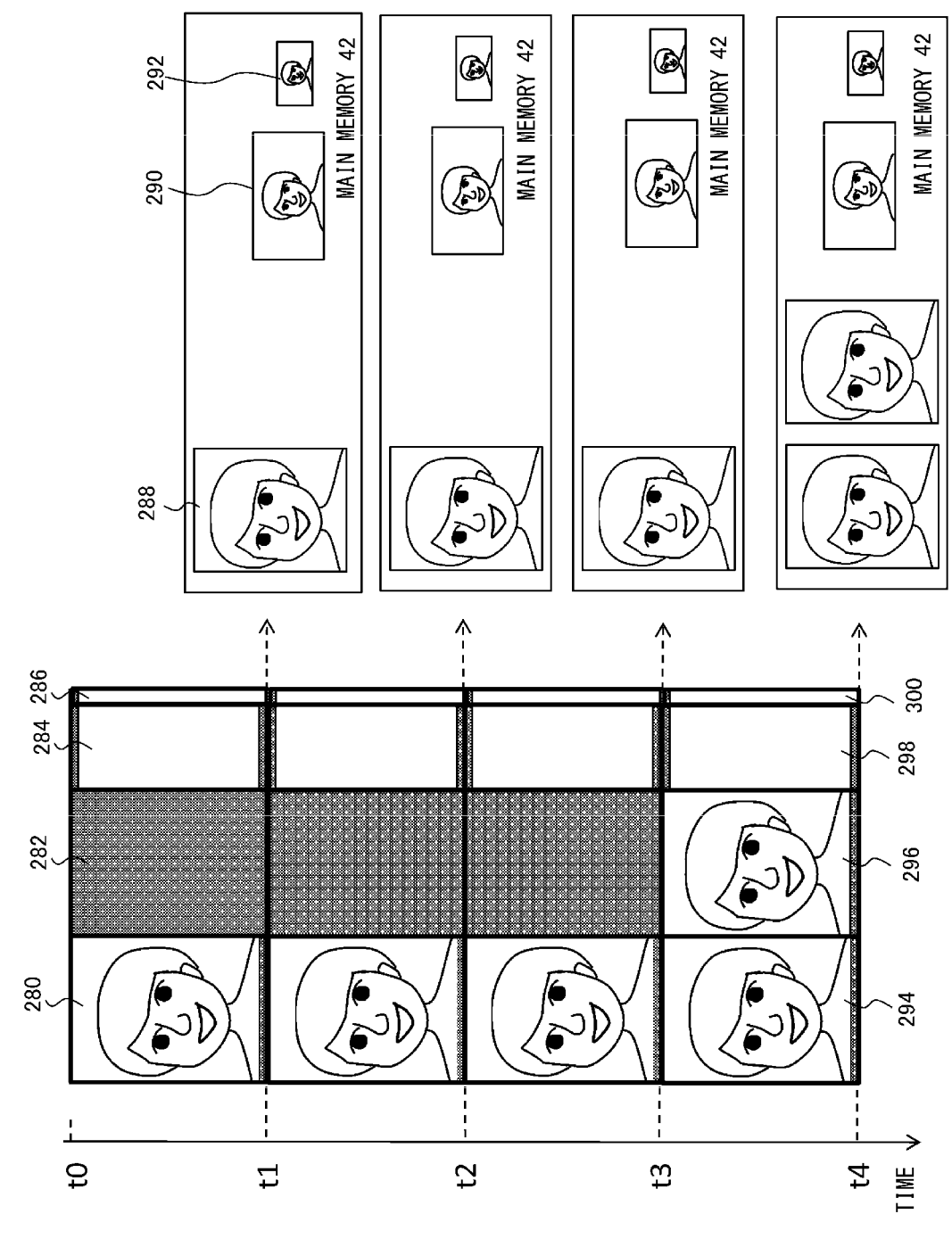
FIG. 11 shows a newly synthesized image which a cropping unit generates by cropping out an image and an image stored in a main memory of the host terminal under the image capturing condition illustrated in FIG. 10.

FIG. 11 shows a newly synthesized image which the cropping unit 150 generates by cropping out an image and an image stored in the main memory 42 of the host terminal 20 under the image capturing condition illustrated in FIG. 10. It is assumed in this case that the host terminal 20 specifies the area indicated in FIG. 9 and requests image data. Respective time points indicated on the vertical axis show time points when respective original frames are captured, while associating the time points with those of FIG. 10. Time for cropping process or time required for the storing process of data into the main memory 42 and processes before the storing process is omitted.

From time t0 to t1 (i.e., the first shooting period), because only a frame image captured by the first camera 22a is input into the cropping unit 150, an image 280 of an area including a face and the surroundings thereof included in a ⅓₁ demosaiced image of the frame, an entire image 284 of a ¼ demosaiced image of the frame, and an entire image 286 of a ¹⁄₁₆ demosaiced image of the frame are extracted for each row. In this process, an area, where an image of the face and the surroundings of the ⅟₁ demosaiced image of a frame captured by the second camera 22b is to be inserted on the synthesized image, is also specified by the host terminal 20 regardless of whether or not image data exists. Therefore, the cropping unit 150 extracts a portion 282, which was invalid data in the original synthesized image, in a similar manner.

Upon receiving such image data in a stream format, the host terminal 20 deploys the image data in the main memory 42. In this process, if the portion, which was invalid data, is abandoned, the storing of images in the main memory 42 is completed at time t1, wherein the stored images are: an image 288 of an area including a face and the surroundings thereof included in a ⅟₁ demosaiced image of a frame captured by the first camera 22a; an entire image 290 of a ¼ demosaiced image of the frame; and an entire image 292 of a ⅟₁₆ demosaiced image of the frame. The same is applied to the second shooting period (from time t1 to time t2) and to the third shooting period (from time t2 to time t3).

From time t3 to t4 (i.e., in the fourth shooting period), data of: images 294 and 296 of an area including a face and the surroundings thereof included in ⅟₁ demosaiced images of a frame captured by the both cameras; an entire image 298 of a ¼ demosaiced image of a frame captured by the first camera 22a; and an entire image 300 of a ⅟₁₆ demosaiced image of the frame captured by the first camera 22a are extracted sequentially and the deployment of the images in the main memory 42 is completed at time t4.

This aspect of the invention can be used for example in the case of displaying on the display device 16 an entire image of a ¼ demosaiced image or a ⅟₁₆ demosaiced image in which the resolution of an area including a face is increased by using a ⅟₁ demosaiced image, while checking the position of a target object (i.e., a user 1 or the like) by performing stereo matching once every four frames in the host terminal 20. The result of the stereo matching is fed back to: a process of specifying an area when requesting image data from the imaging device 12; a zooming mechanism or a pan/tilt control mechanism of the imaging device 12; or the like. With this, an entire image, where only a target object and the surroundings thereof are displayed in detail, can be constantly displayed with a minimum image data transmission, even when the target object moves.

Alternatively, different exposure times may be set for the two cameras and the two cameras may be used for different purposes so that an image with a long exposure time and sufficient brightness is used for displaying and an image with low brightness and high frame rate is used for image analysis.

Figure 12:
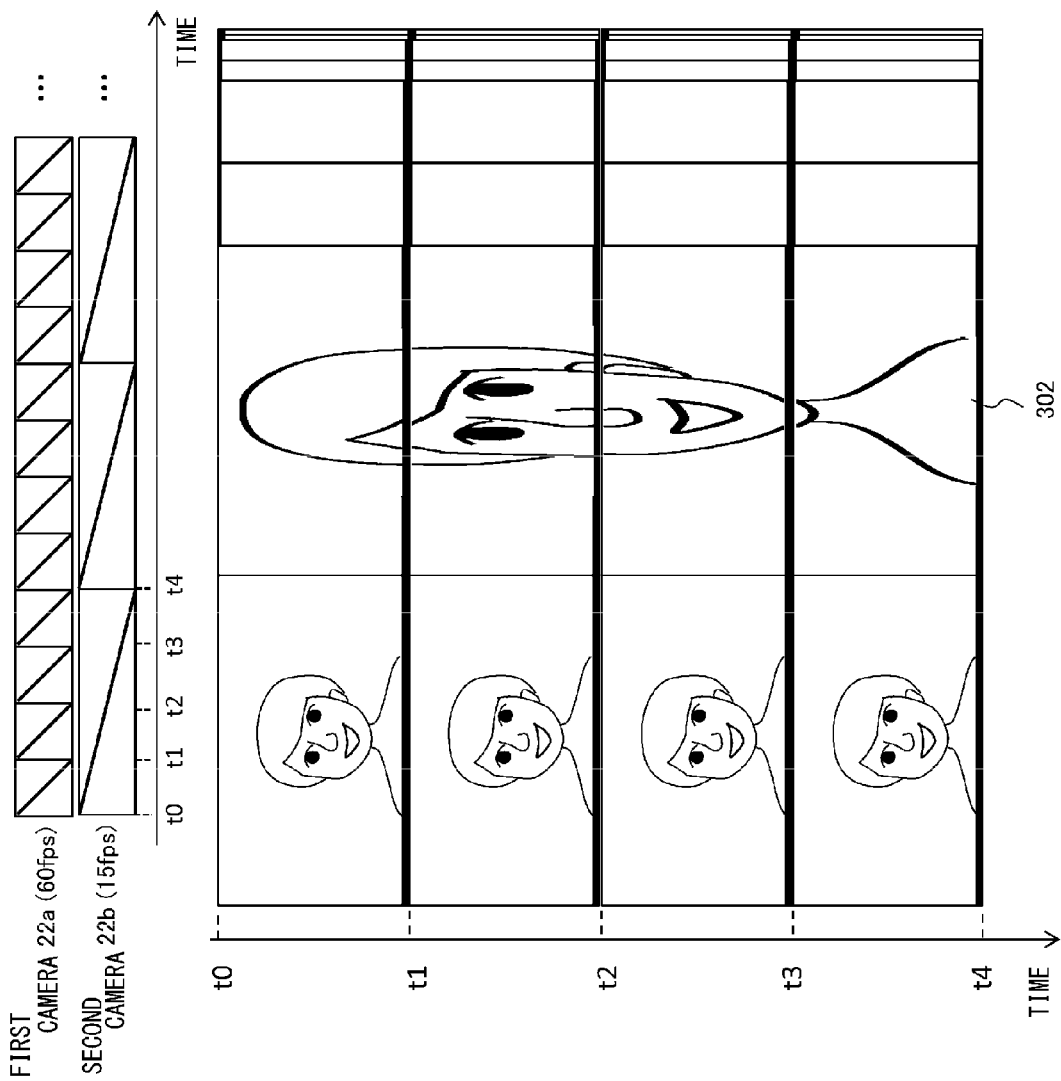
FIG. 12 shows a transition of an synthesized image in case that the shutter speed of the second camera is reduced to ¼ so that the second camera captures one frame while the first camera captures four frames under one of specific conditions that satisfy the image capturing condition shown in FIG. 10.

FIG. 12 shows a transition of an synthesized image in the case that the shutter speed of the second camera 22b is reduced to ¼ so that the second camera 22b captures one frame while the first camera 22a captures four frames instead of the image capturing conditions shown in FIG. 10. In this case, the horizontal row of the ⅟₁ demosaiced image for which data is output from the second camera 22b does not change until data for four horizontal rows of the ⅟₁ demosaiced image is output from the first camera 22a. In a similar manner, also for images of other resolutions, data is output from the second camera 22b in a period, which are four times that of data output from the first camera 22a. The frame rates and the shutter speeds are just shown as an example, and any frame rates and shutter speeds can be adopted as far as the frame rates and shutter speeds satisfy a condition that the frame rate and the shutter speed of the second camera 22b are 1/N (N is a positive integer more than one) of those of the first camera 22a.

As a result, as shown in the figure, a ⅟₁ demosaiced image 302 of a frame captured by the second camera 22b is in a state extended to four times the vertical length (more specifically, an image having a same pixel value for every four rows of pixels) in a synthesized image where the passage of time corresponds to pixels in the vertical direction. In the figure, a portion including the head of the user 1 is output in the first shooting period (from time t0 to t1), a portion including the eyes is output in the second shooting period (from time t1 to t2), a portion including the mouth is output in the third shooting period (from time t2 to t3), and a portion including the shoulders is output in the fourth shooting period (from time t3 to t4), and also the ¼ demosaiced image, the ⅟₁₆ demosaiced image, and the ⅟₆₄ demosaiced image become reduced images thereof for each shooting period.

Figure 13:
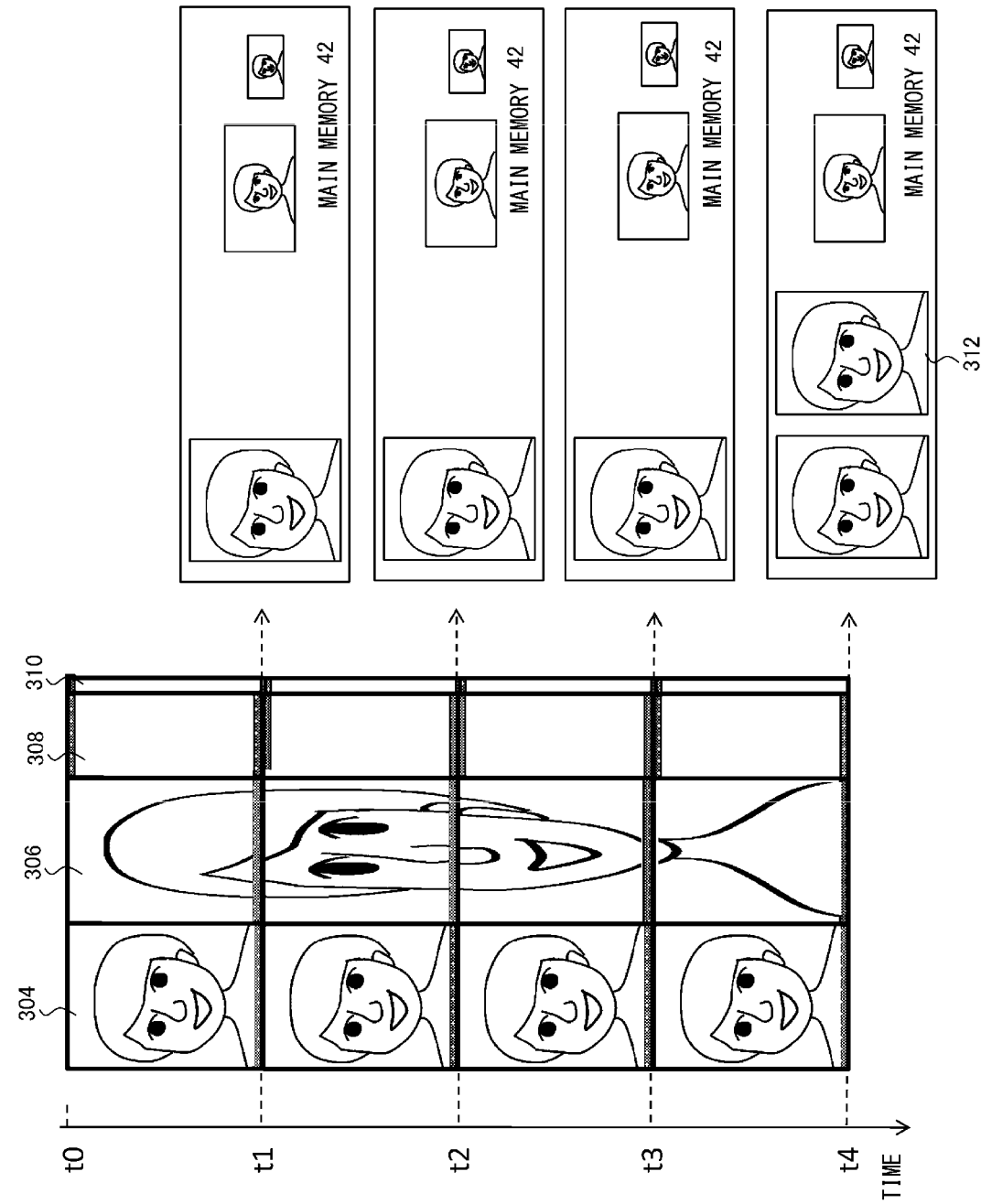
FIG. 13 shows a newly synthesized image which the cropping unit generates by cropping out an image and an image stored in a main memory of the host terminal under the image capturing condition illustrated in FIG. 12.

FIG. 13 shows a newly synthesized image which the cropping unit 150 generates by cropping out an image and an image stored in the main memory 42 of the host terminal 20 under the image capturing condition illustrated in FIG. 12. The figure is presented in a similar manner to that of the FIG. 11. In this case, from time t0 to t1 (i.e., the first shooting period), an image 304 of an area including a face and the surroundings thereof included in a ⅟₁ demosaiced image of a frame captured by the first camera 22a, an image 306 of a part of an area including a face and the surroundings thereof included in a ⅟₁ demosaiced image of a frame captured by the second camera 22b, an entire image 308 of a ¼ demosaiced image of a frame captured by the first camera 22a, and an entire image 310 of a ⅟₁₆ demosaiced image of the frame are extracted for each single row.

Figure 15:
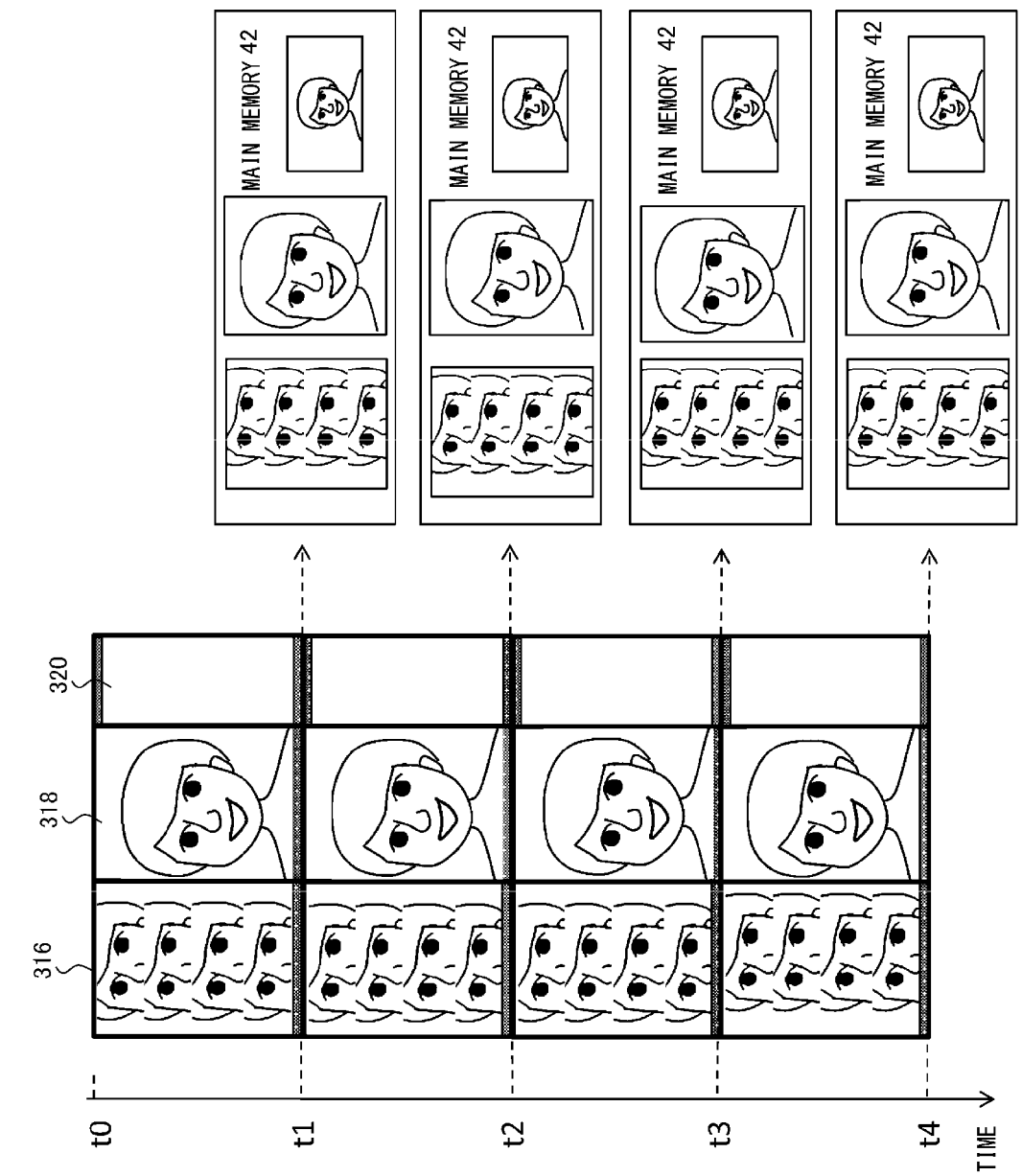
FIG. 15 shows a newly synthesized image which the cropping unit generates by cropping out an image and an image stored in a main memory of the host terminal under the image capturing condition illustrated in FIG. 14.

The host terminal 20 deploys image data in the main memory 42 in a similar manner to that shown in FIG. 11. However, the host terminal 20 abandons data in the amount of three rows from four rows of data having a same pixel value in a ⅟₁ demosaiced image portion of a frame captured by the second camera 22b included in a stream transmitted from the imaging device 12. As a result, at time t4, when the fourth shooting period ends, the deployment of an image 312 of an area including a face and the surroundings thereof included in a ⅟₁ demosaiced image of a frame captured by the second camera 22b is completed. As the images in the main memory 42, only images, with which the deployment has been completed, at the time of completion of deployment are shown in FIGS. 11, 13, and 15. However, the storing process of the ⅟₁ demosaiced image of the frame captured by the second camera 22b shown in FIG. 13 is started right after the time t0 and proceeds gradually in practice. Other images in the main memory 42 are similar to that shown in FIG. 11.

Figure 14:
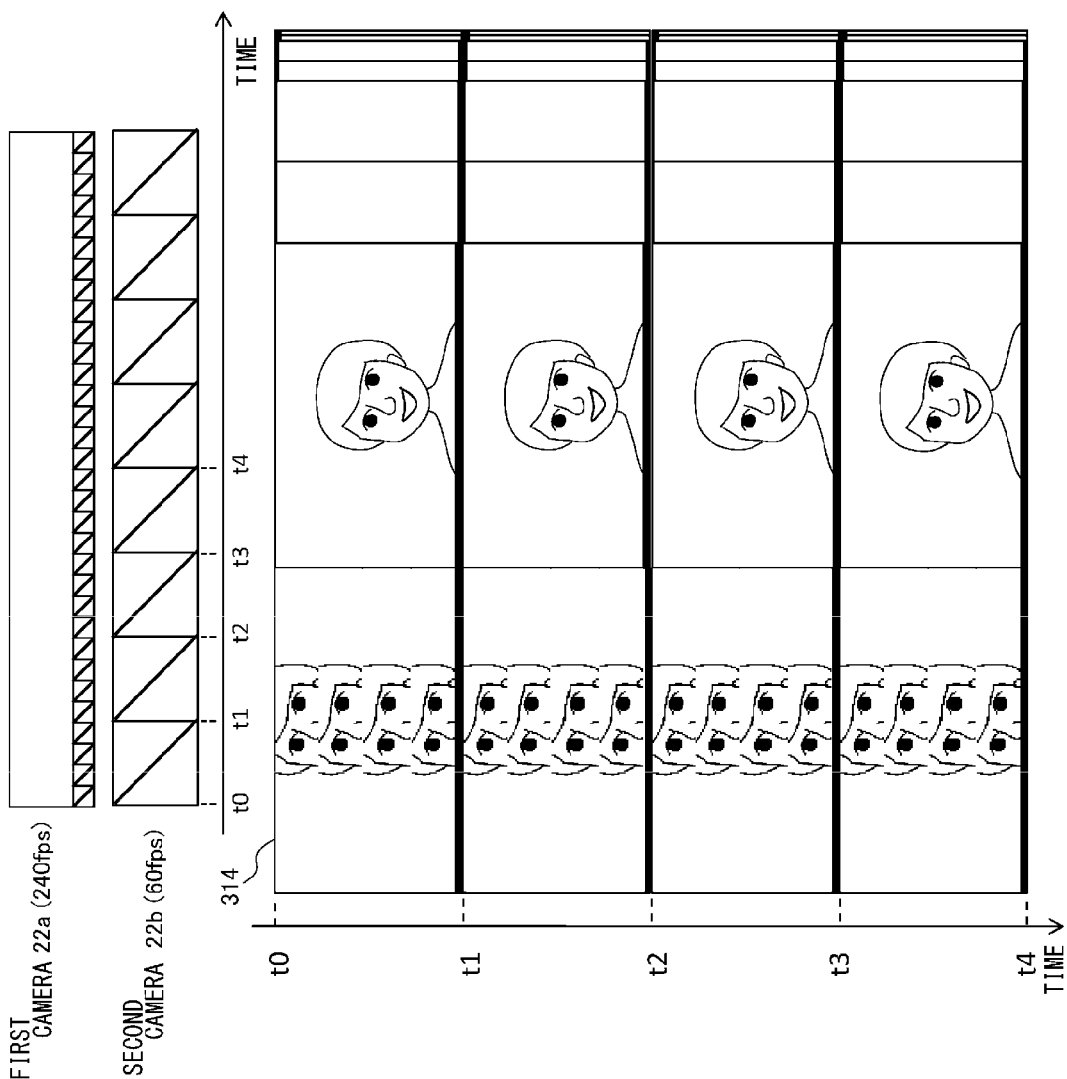
FIG. 14 shows a transition of an synthesized image in the case that the first camera captures an image with an angle of view narrower than that of the second camera, and with a frame rate higher than that of the second camera.

FIG. 14 shows a transition of an synthesized image in the case that the frame rate of the second camera 22b is set to 60 fps and the first camera 22a captures an image with an angle of view narrower than that of the second camera 22b with a frame rate 240 fps, which is higher than that of the second camera 22b. In the example shown in the figure, the first camera 22a captures the portion including the eyes of the user 1 four times while the second camera 22b captures one frame. These values are just shown as an example, and the two cameras can be synchronized as shown in the figure by setting the frame rate of the first camera 22a to N times of that of the second camera 22b (N is a positive integer more than one) when the vertical length of the field of view of the first camera 22a is 1/N of that of the first camera 22a.

Therefore, in synthesized images corresponding to respective shooting periods of the second camera 22b, a ⅟₁ demosaiced image 314 of a frame of the first camera 22a is an image where four images of a portion including the eyes of the user 1 are arranged in series in the vertical direction as shown in the figure. The ¼ demosaiced image, the ¹⁄₁₆ demosaiced image, and the ¹⁄₆₄ demosaiced image of the first camera 22a also become reduced images thereof for each shooting period.

FIG. 15 shows a newly synthesized image which the cropping unit 150 generates by cropping out an image and an image stored in the main memory 42 of the host terminal 20 under the image capturing condition illustrated in FIG. 14. The figure is presented in a similar manner to that of the FIG. 11. However, in the case of the figure, a ⅓ demosaiced image 316 of a portion including the eyes captured by the first camera 22a with a high frame rate, and a ⅓ demosaiced image 318 and a ¼ demosaiced image 320 of a frame captured by the second camera are cropped out.

As a result, the deployments of the images in the main memory 42 of the host terminal 20 are completed at a time points corresponding to end times of respective shooting periods. This aspect of the invention can be used for example in the case of displaying on the display device 16 an entire image of ¼ demosaiced image where the resolution of an area including a face is increased by using the ⅓ demosaiced image, while detecting a facial expression or a gesture by tracking the motion of the eyes or eyelids with high time resolution by using the ⅓ demosaiced image of the portion including the eyes.

In this process, an image to be displayed can be processed in accordance with a detected facial expression or gesture. By displaying the image on a display device of another user via a network, video chat or the like can be realized where decoration and/or animation is added to an image in accordance with a facial expression. Although in the example shown in FIG. 15, a portion including the eyes is captured with a high frame rate, a hand of a user or a marker held by a user may be captured and may be set as a tracking target. In this case, the movement of the hand or the marker can be used as an operational input means for information processing.

Figure 16:
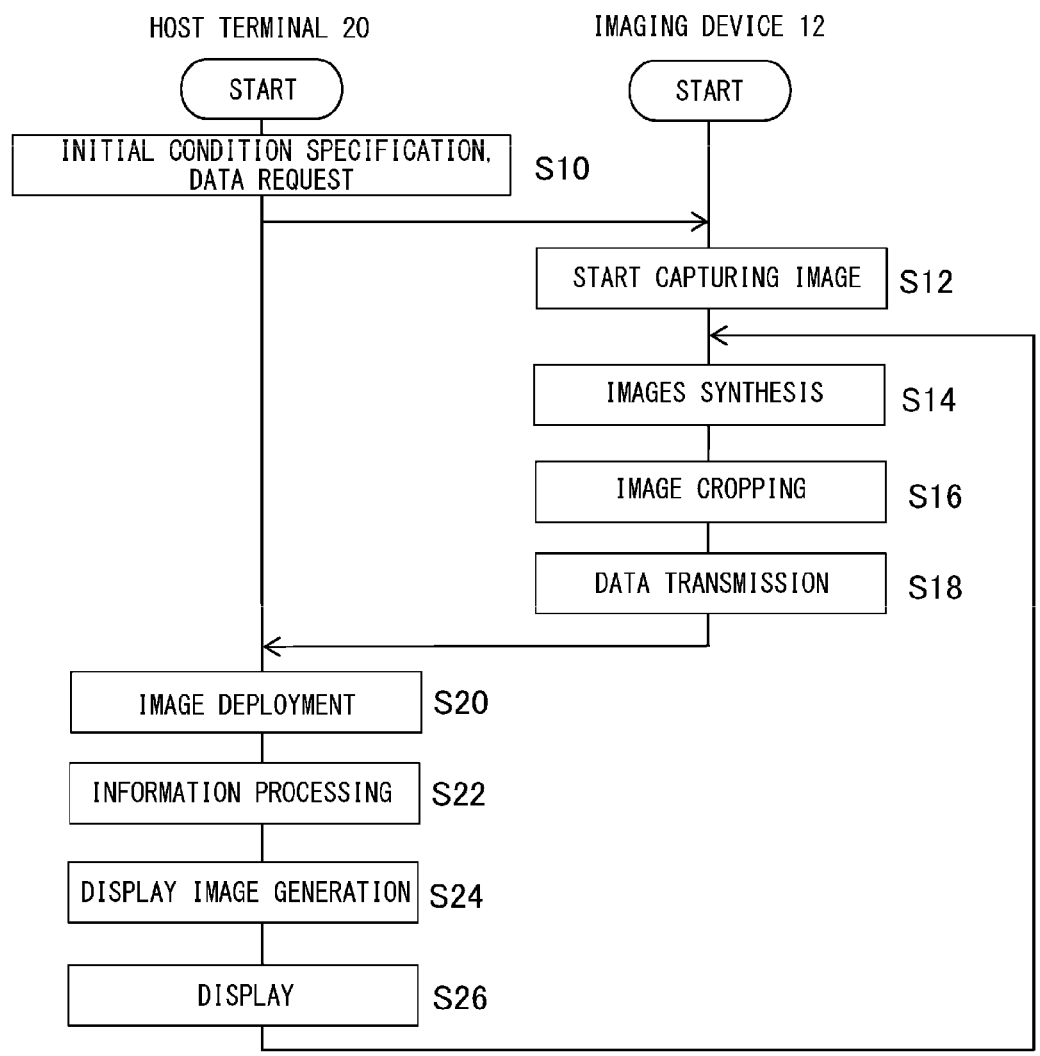
FIG. 16 shows a flowchart indicating an example of a processing procedure where the host terminal and the imaging device display an image in cooperation with each other in accordance with the present embodiment.

FIG. 16 shows a flowchart indicating an example of a processing procedure where the host terminal 20 and the imaging device 12 display an image in cooperation with each other. The flow chart of FIG. 16 is started by a user's instruction to activate an application input through the host terminal 20. Although respective steps are represented by rectangles connected in series in order to facilitate the understanding, these steps are assumed to be executed in parallel for each row of pixels and for each frame in a period in which a moving image is captured.

First, the host terminal 20 instructs the imaging device 12 to start shooting and requests the transmission of data from the imaging device 12 by specifying an initial condition and necessary image data, which are set for an application program or the like (S10). The initial condition refers to a resolution, a frame rate, a shutter speed, an angle of view, or the like of a moving image captured by the two cameras of the imaging device 12. The resolution and/or the frame rate of a moving image captured by the cameras may be changed by changing the condition setting of exposures itself by an imaging element, or may be changed by an adjustment, such as, thinning-out of data sent from the imaging element at a subsequent process.

The necessary image data is specified by an area in a synthesized image as described above. However, a ⅓ demosaiced image of an area which is considered to include a user image, or an entire image with any one of the resolutions is specified as an initial value. The first camera 22a and the second camera 22b of the imaging device 12 that receives the specification of the initial condition and the request for the image data starts capturing of a moving image under the initial condition (S12).

A RAW image captured by each camera is processed for each row of pixels by the demosaicing units 104a and 104b, and by the pyramid filter units 135a and the 135b. Demosaiced images for respective levels that are output in respective time steps are synthesized by the image synthesis unit 30 (S14). Subsequently, the image transmission unit 32 crops out only image data specified at step S10 from the synthesized image so as to form a stream, packetizes the stream and transmits the packet to the host terminal 20 (S16 and S18). In the case that the data of RAW image is requested, the process of step S16 may be skipped.

The information processing unit 38 of the host terminal 20, which has received data, deploys the transmitted stream as an image in the main memory 42 (S20). By using the deployed image, the information processing unit 38 performs a process in accordance with an application that is being executed (S22). At this time, the information processing unit 38 requests for image processing from the image processing unit 40 as necessary, and the image processing unit 40 reads out an image from the main memory 42, and processes or synthesizes the image. The image data deployed in the main memory 42 is similar to commonly-used image data. Therefore, the deployed image data can also be read out as a texture.

The information processing unit 38 may perform an image analysis processing, such as stereo matching, tracking, face detection, gesture detection, or the like in step S22, and may reflect the result thereof to an image to be displayed. In this manner, an image to be displayed is generated and is displayed on the display device 16 (S24 and S26). In addition, the information processing unit 38 may identify an area including a target object by the image analysis described above in step S22, and may change image data to request. In this case, the cropping unit 150 in the imaging device 12 changes an area to be cropped out in accordance with the specification when processing a new image frame. By repeating the process of step S14 through step S26, a moving image using an image captured by the imaging device 12 can be displayed on the display device 16.

According to the present embodiment described above, in a system including a camera for capturing the movement of a user or the like and a host terminal for displaying an image using the camera, a moving image that has been captured is changed into data having a plurality of resolutions inside the camera. The data is then changed into a stream in which pixel values are connected in raster order of pixels for each type and resolution of an image. Then, a part thereof is transmitted in accordance with a request from the host terminal so as to construct an image in a memory of the host terminal. As described, by sequentially performing processes in a state of a pixel row without deploying the data as a frame image inside the camera, the size of a memory to be provided in the camera can be kept to a minimum. Also, since there arises no need to wait for all data for a single frame to be ready until the transmission to the host terminal after the image capturing, the system as a whole is capable of image display corresponding to the movement with low latency.

Also, image data of a plurality of resolutions is included in a single stream by connecting, for each pixel value for a single row, respective pieces of the data. A rate at which the "pixel value for a single row" is generated varies depending on a resolution. Thus, in the case of an image having a low resolution in which data is generated at a low rate, allocation is performed such that the data is included evenly in a stream even during a period in which the data is not generated. With this, the size of data to be processed and transmitted per unit time becomes equal. Thus, estimation of time required until outputting, a transmission bandwidth to be used, and time required for transmission becomes easy, and a possibility of depletion of the transmission bandwidth due to an unexpected increase in data size is decreased.

In a subsequent process, a stream generated as described can be treated in the same way as a stream composed of only image data of a single resolution. Thus, a synthesized image is substantially generated that is composed of an image having a plurality of resolutions. By connecting respective pieces of data as described above, each image to be combined forms a rectangular area in a synthesized image. Thus, by specifying an area in the synthesized image, respective pieces of data of a plurality of images that coexist in a single stream can be easily separated by a commonly-used image process called cropping.

A plurality of areas included in a synthesized image are segmented and clipped by a cropping process concurrently, and transmitted as a stream in a state where a plurality of types of image data coexist. In this process, by setting a same range as the vertical ranges of the plurality of areas, cropping process can be performed while rectangular areas in the synthesized image are maintained even if actual processing is performed for each row of pixels. Therefore, images can be easily distinguished at the host terminal.

Since a plurality of pieces of image data can be mixed and sent concurrently, various types of image data can be transmitted with low latency and can be used for image processing without providing a multi-channel transmission mechanism that can transmit pieces of data in parallel. According to similar principle to that of the synthesized image, the sizes of respective pieces of data included in a stream are equalized in accordance with a data generation rate of image data of respective sizes, also in a stream of data to be transmitted. Therefore, occurrence of a transmission delay due to increasing bit rate is restrained.

Given above is an explanation based on the embodiments. The embodiments are intended to be illustrative only and it will be obvious to those skilled in the art that various modifications to constituting elements and processes could be deployed and that such modifications are also within the scope of the present invention.

For example, according to the embodiment, a plurality of pieces of image data, which are representations of a stereo image in different resolutions, are mixed in a stream so as to generate a virtual synthesized image. In this case, the embodiment is especially effective in the sense that bit rates can be equalized by arranging images of different data generation rates in a synthesized image appropriately. Meanwhile, an image included in a synthesized image is not limited to the images described above, but any images, as far as the images are a plurality of types of images generated at respective time points, can be synthesized, cropped, and sent to a host terminal in a similar manner.

For example, the images may be composed only of a pair of stereo images in one resolution. Alternatively, a depth image that expresses on an image plane the position of a target object in the depth direction, a difference image between frames, or the like may be mixed in the images. In the latter case, a mechanism for stereo matching and/or a mechanism for differential processing between frames are provided in the imaging device. Alternatively, the images may not be a stereo image but may be a plurality of types of images generated from a single frame image. In any of the cases, by specifying a plurality of areas having a common range in the vertical direction in the synthesized image, a plurality of types of images can be cropped concurrently by a cropping process, mixed into a stream, and sent to a host terminal. With this, in the host terminal, a plurality of types of images can be acquired with low latency by just specifying areas without providing a plurality of channels of transmission paths.

DESCRIPTION OF THE REFERENCE NUMERALS

10 information processing system, 12 imaging device, 16 display device, 20 host terminal, 22*a* first camera, 22*b* second camera, 30 image synthesis unit, 32 image transmission unit, 34 communication unit, 36 instruction input unit, 38 information processing unit, 40 image processing unit, 42 main memory, 44 communication unit, 102*a* image acquisition unit, 104*a* demosaicing unit, 110*a* first filter, 120*a* second filter, 130*a* third filter, 135*a* pyramid filter unit, 140 output timing adjusting unit, 142 control unit, 144 data selection unit, 146 packetizing unit, 148 stream selection unit, and 150 cropping unit.

INDUSTRIAL APPLICABILITY

As described above, the present invention is applicable to an information processing device and to an information processing system such as a computer, a game device, a camera, an image display device, or the like.

The invention claimed is:
1. A moving image capturing device comprising:
an image data generation circuit configured to generate a plurality of pieces of image data from each frame image of a moving image obtained by capturing an image of a target object, and configured to sequentially output the image data as a stream for each single horizontal row of pixels;
an image synthesis circuit configured to cyclically connect the plurality of pieces of image data, which is output from the image data generation circuit, for each single horizontal row of pixels or for each row of pixels for a range smaller than the single horizontal row, and configured to output resultant data as a stream so as to generate a virtual synthesized image which includes the plurality of images and in which a row of pixels that results when a connection cycle is completed is defined as a horizontal row of pixels; and
an image transmission circuit configured to receive, from a connected host terminal, a request to transmit data specifying a plurality of rectangular areas having a common vertical range in the virtual synthesized image, configured to crop out ranges corresponding to the rectangular areas for each row of pixels of the virtual synthesized image output by the image synthesis circuit, configured to connect the ranges, and configured to transmit as a stream to the host terminal.
2. The moving image capturing device according to claim 1, further comprising two cameras configured to capture an image of the target object from viewpoints arranged at right and left with a known distance in between,
wherein the image data generation circuit generates a plurality of pieces of image data of different resolutions by reducing the size of the right and left frame images captured by the two cameras into a plurality of sizes, respectively.

3. The moving image capturing device according to claim 2,
wherein a second camera of the two cameras captures, at a same shutter speed, one frame each time a first camera captures a predetermined number of frames more than one,
wherein the image synthesis circuit adds invalid data to the stream by connecting the invalid data instead of image data generated from a frame image captured by the second camera in a period in which only image data generated from a frame image captured by the first camera is output from the image data generation circuit, and
wherein the image transmission circuit crops out a specified area regardless of whether or not invalid data exists.

4. The moving image capturing device according to claim 2,
wherein a second camera of the two cameras captures an image at a frame rate and a shutter speed that are 1/N (N is a positive integer more than one) of those of the first camera, and
wherein the image synthesis circuit connects, N times, a single horizontal row of pixels of image data generated from a frame image captured by the second camera, for respective N horizontal rows of pixels of image data generated from a frame image captured by the first camera.

5. The moving image capturing device according to claim 2,
wherein a first camera of the two cameras captures an image with a field of view of which the vertical length is 1/N (N is a positive integer more than one) of that of a second camera, at a frame rate that is N times of that of the second camera, and
wherein the image synthesis circuit connects rows of pixels of image data for N frames captured by the first camera to rows of pixels of image data for one frame captured by the second camera, respectively.

6. The moving image capturing device according to claim 1
wherein the image data generation circuit generates a plurality of pieces of image data of different resolutions by reducing both of the vertical size and the horizontal size of each frame image to ½, and
wherein the image synthesis circuit connects a single horizontal row of pixels of an image of which the reduction ratio is $½^n$ (n is an integer) by cyclically connecting respective rows of pixels generated by dividing the single horizontal row of pixels of the image of which the reduction ratio is $½^n$ by $2^n$.

7. The moving image capturing device according to claim 1, wherein
the image data generation circuit generates the plurality of pieces of image data in parallel by setting a single horizontal row of pixels as a processing circuit, and outputs the image data to the image synthesis circuit sequentially, and
the image synthesis circuit sequentially connects the image data output from the image data generation circuit and outputs the image data as a stream.

8. The moving image capturing device according to claim 7, wherein the image synthesis circuit connects image data so that the plurality of images are configured as rectangular areas respectively in the synthesized image.

9. An information processing system comprising: a moving image capturing device configured to capture an image of a target object and generate moving image data; and a host terminal configured to acquire a part of the moving image data from the moving image capturing device, configured to perform a predetermined image processing by using the part of the moving data, and configured to display an image,
wherein the moving image capturing device comprises:
an image data generation circuit configured to generate a plurality of pieces of image data from each frame image of a moving image and configured to output the image data sequentially as a stream for each single horizontal row of pixels;
an image synthesis circuit configured to cyclically connect the plurality of pieces of image data, which is output from the image data generation circuit, for each single horizontal row of pixels or for each row of pixels for a range smaller than the single horizontal row, and configured to output resultant data as a stream so as to generate a virtual synthesized image which includes the plurality of images and in which a row of pixels that results when a connection cycle is completed is defined as a horizontal row of pixels; and
an image transmission circuit configured to receive, from a connected host terminal, a request to transmit data specifying a plurality of rectangular areas having a common vertical range in the virtual synthesized image, configured to crop out ranges corresponding to the rectangular areas for each row of pixels of the virtual synthesized image output by the image synthesis circuit, configured to connect the areas, and configured to transmit as a stream to the host terminal, and
wherein the host terminal comprises:
a data requesting circuit configured to specify a plurality of rectangular areas in the virtual synthesized image, the rectangular areas corresponding to at least two pieces of image data included in a plurality of pieces of image data generated in the moving image capturing device, by setting a common vertical range for the rectangular areas so as to request transmission of data; and
a data deploying circuit configured to segment the stream transmitted from the moving image capturing device into pieces of individual image data on the basis of a horizontal length of each specified rectangular area and configured to deploy the data into a memory as a two dimensional image.

10. An information processing device comprising:
a data requesting circuit configured to request transmission of data from a moving image capturing device, which generates a synthesized image where a plurality of images that are generated from each frame image of a moving image obtained by capturing an image of a target object are disposed at predetermined rectangular areas respectively, by specifying a plurality of rectangular areas in the synthesized image, the rectangular areas corresponding to at least two pieces of image data, while setting a common vertical range for the rectangular areas;
a data deploying circuit configured to separate image data transmitted from the moving image capturing device in a stream format in response with the request, where pixel values of the specified plurality of rectangular areas are connected for each row of pixels cyclically, into one or more pieces of individual image data on the basis of a horizontal length of each specified rectangular region and configured to deploy the data into a memory as a two dimensional image; and a data processing circuit configured to perform a predetermined image processing by using the two dimensional image and configured to display an image.

11. An image data processing method performed by a moving image capturing device comprising:

generating a plurality of pieces of image data from each frame image of a moving image obtained by capturing an image of a target object, and sequentially outputting the image data as a stream for each single horizontal row of pixels;

connecting cyclically the output plurality of pieces of image data for each single horizontal row of pixels or for each row of pixels for a range smaller than the single horizontal row, and outputting resultant data as a stream so as to generate a virtual synthesized image which includes the plurality of images and in which a row of pixels that results when a connection cycle is completed is defined as a horizontal row of pixels; and receiving, from a connected host terminal, a request to transmit data specifying a plurality of rectangular areas having a common vertical range in the virtual synthesized image, cropping out ranges corresponding to the rectangular areas for each row of pixels of the virtual synthesized image, connecting the ranges, and transmitting as a new stream to the host terminal.

12. A non-transitory computer-readable recording medium having embodied thereon a program for a computer of an image capturing device that generates a plurality of pieces of image data from each frame image of a moving image obtained by capturing an image of a target object, and sequentially outputs the image data as a stream for each single horizontal row of pixels, the program comprising:

a module configured to connect cyclically the output plurality of pieces of image data for each single horizontal row of pixels or for each row of pixels for a range smaller than the single horizontal row, and configured to output resultant data as a stream so as to generate a virtual synthesized image which includes the plurality of images and in which a row of pixels that results when a connection cycle is completed is defined as a horizontal row of pixels; and a module configured to receive, from a connected host terminal, a request to transmit data specifying a plurality of rectangular areas having a common vertical range in the virtual synthesized image, configured to crop out ranges corresponding to the rectangular areas for each row of pixels of the virtual synthesized image, configured to connect the ranges, and configured to transmit as a new stream to the host terminal.

* * * * *